(12) United States Patent
Lee et al.

(10) Patent No.: US 8,087,093 B2
(45) Date of Patent: Dec. 27, 2011

(54) MECHANICALLY-COUPLED TUNING FORK-SCANNING PROBE VIBRATING SYSTEM

(75) Inventors: Seung Gol Lee, Incheon (KR); Kyoung-Duck Park, Incheon (KR); Dae-Chan Kim, Incheon (KR)

(73) Assignee: Inha-Industry Partnership Institute, Incheon (KR)

( * ) Notice: Subject to any disclaimer, the term of this patent is extended or adjusted under 35 U.S.C. 154(b) by 214 days.

(21) Appl. No.: 12/555,395

(22) Filed: Sep. 8, 2009

(65) Prior Publication Data
US 2010/0299791 A1 Nov. 25, 2010

(30) Foreign Application Priority Data
May 20, 2009 (KR) .................. 10-2009-0043803

(51) Int. Cl.
G12B 21/06 (2006.01)
G01N 13/14 (2006.01)
G01Q 60/32 (2010.01)
G01Q 60/34 (2010.01)
(52) U.S. Cl. .......................... 850/37; 850/38
(58) Field of Classification Search .......... 850/32, 850/37, 38, 40, 53, 33; 331/154, 158
See application file for complete search history.

(56) References Cited

U.S. PATENT DOCUMENTS
6,075,585 A * 6/2000 Minne et al. ................ 355/71
6,201,227 B1 * 3/2001 Tomita ...................... 250/201.3
6,257,053 B1 * 7/2001 Tomita et al. .................. 850/37

OTHER PUBLICATIONS

Morville, J. Liu, A. Callegari, and M. Chergui, "Q-factor optimization of a tuning-fork/fiber sensor for shear-force detection," Appl. Phys. Lett. 86, 064103 (2005).*

* cited by examiner

Primary Examiner — Jack Berman
Assistant Examiner — Wyatt Stoffa
(74) Attorney, Agent, or Firm — Sherr & Vaughn, PLLC

(57) ABSTRACT

Provided is a mechanically-coupled tuning fork-scanning probe vibrating system, the system including: a tuning fork vibrating due to an AC voltage applied thereto; a scanning probe attached to a side of the tuning fork and vibrating due to the tuning fork; and a contact member contacting a side surface of the scanning probe and adjusting a position of a contact point at which the contact member contacts with the scanning probe, to vary a natural frequency of a combination body in which the tuning fork and the scanning probe are combined with each other. A natural frequency of the mechanically-coupled tuning fork-scanning probe vibrating system is closer to a natural frequency of the tuning fork itself by using a dynamic vibration control method using a contact member so that a energy loss of the mechanically-coupled tuning fork-scanning probe vibrating system can be minimized, a quality factor of the mechanically-coupled tuning fork-scanning probe vibrating system can be maximized, the quality factor can be actively controlled regardless of an environment of a specimen to be detected and both a specimen in air and a specimen in a liquid medium with high viscosity can be detected with high resolution.

6 Claims, 25 Drawing Sheets

Q = 90

Q = 5600

In air

In water

--Related Art--

MECHANICALLY-COUPLED TUNING FORK-SCANNING PROBE VIBRATING SYSTEM

CROSS-REFERENCE TO RELATED PATENT APPLICATIONS

This application claims the benefit of Korean Patent Application No. 10-2009-0043803, filed on May 20, 2009, in the Korean Intellectual Property Office, the disclosure of which is incorporated herein in its entirety by reference.

BACKGROUND OF THE INVENTION

1. Field of the Invention

The present invention relates to a mechanically-coupled tuning fork-scanning probe vibrating system for use in a scanning probe microscope, and more particularly, to a mechanically-coupled tuning fork-scanning probe vibrating system of which quality factor is maximized or controlled in a wide range so that distances between a detection tip of a scanning probe and a surface of a specimen can be detected with high resolution or a detection time can be reduced.

2. Description of the Related Art

Near-field scanning optical microscopes (NSOM) are a scanning probe microscope type in which a very small hole having a thickness equal to or less than 100 nm is perforated in a long probe having a sharp tip and the height of a surface of a specimen to be observed and optical characteristics of the specimen are detected while the probe is relatively moved with respect to the surface of the specimen forwards and backwards and right and left. General optical microscopes are based on detection of a far field and thus, diffraction of light occurs so that the optical microscopes have a resolution limit of about 200 nm. On the other hand, in NSOMs, a near field is detected by using a scanning probe having a numerical aperture (NA) that is equal to or less than 100 nm. Thus, the resolution limit of general optical microscopes can be overcome, and information about a three dimensional shape of the surface of the specimen and optical information thereof can be simultaneously detected.

FIGS. 1A and 1B schematically illustrate a conventional mechanically-coupled tuning fork-scanning probe vibrating system. Referring to FIGS. 1A and 1B, the conventional mechanically-coupled tuning fork-scanning probe vibrating system includes a tuning fork 10 having a detection circuit (not shown) installed therein and detecting variation of amplitudes and phases of the system, and a scanning probe 20 attached to the tuning fork 10 via an adhesive 30 and including a detection tip 22 having an end of a cross-sectional size of several microns or equal to or less than several microns. The system illustrated in FIGS. 1A and 1B detects variation of shear forces applied between the scanning probe 20 and the surface of a specimen and adjusts distances between the scanning probe 20 and the surface of the specimen up to a nanometer scale. The shear force is the Van der Waal's force that is generated between the detection tip 22 and the surface of the specimen when the scanning probe 20 having a length equal to or less than 20 nm is proximate to the surface of the specimen.

In connection with adjusting distances between the scanning probe 20 and the surface of the specimen in the system of FIGS. 1A and 1B, first, an AC voltage having a predetermined frequency is applied to the tuning fork 10 to which the scanning probe 20 is attached, so that the tuning fork 10 and the scanning probe 20 vibrate. Then, when the scanning probe 20 is proximate to the surface of the specimen and vibration of the scanning probe 20 is reduced by the shear force applied between the scanning probe 20 and the surface of the specimen, reduced vibration of the tuning fork 10 is detected by the detection circuit as variation of amplitudes and phases of the tuning fork 10 so that the distances between the scanning probe 20 and the surface of the specimen can be adjusted to a nanometer scale.

When the frequency of the AC voltage applied to the tuning fork 10 varies and an output voltage of the detection circuit installed in the tuning fork 10 is detected, the highest output voltage is recorded at a resonant frequency of the conventional mechanically-coupled tuning fork 10-scanning probe 20 vibrating system, and as the frequency of the AC voltage applied to the tuning fork 10 is farther away from the resonant frequency of the conventional mechanically-coupled tuning fork 10-scanning probe 20 vibrating system, the output voltage of the detection circuit installed in the tuning fork 10 is reduced. The output voltage according to the frequency of the AC voltage applied to the tuning fork 10 is referred to as a frequency response curve of the conventional mechanically-coupled tuning fork 10-scanning probe 20 vibrating system. In this case, a value that is obtained by dividing the resonant frequency of the conventional mechanically-coupled tuning fork 10-scanning probe 20 vibrating system by a half width of the frequency response curve is referred to as a quality factor. Accuracy of adjusting the distances between the detection tip 22 of the scanning probe 20 and the surface of the specimen is determined by the quality factor of the conventional mechanically-coupled tuning fork 10-scanning probe 20 vibrating system. That is, when the detection tip 22 of the scanning probe 20 having a length equal to or less than 20 nm is proximate to the surface of the specimen, the physical characteristics of the conventional mechanically-coupled tuning fork 10-scanning probe 20 vibrating system vary due to the effect of the shear force, and the resonant frequency of the conventional mechanically-coupled tuning fork 10-scanning probe 20 vibrating system varies, and the frequency response curve is moved left or right. In this case, the frequency of the AC voltage applied to the tuning fork 10 is the resonant frequency of the conventional mechanically-coupled tuning fork 10-scanning probe 20 vibrating system when the shear force is not detected, i.e., before the physical characteristics of the conventional mechanically-coupled tuning fork 10-scanning probe 20 vibrating system vary due to the shear force. Thus, as the frequency response curve is moved left or right, the output voltage of the tuning fork 10 is reduced. In connection with accuracy of adjusting the distances between the detection tip 22 of the scanning probe 20 and the surface of the specimen, when the quality factor of the conventional mechanically-coupled tuning fork 10-scanning probe 20 vibrating system is large, variation of the output voltage of the tuning fork 10 due to the shear force becomes larger. Thus, variation of the distances can be more accurately detected.

In other words, as the quality factor of the conventional mechanically-coupled tuning fork 10-scanning probe 20 vibrating system increases, the shear force may be more sensitively detected in the scanning probe microscope, which means that the distances between the detection tip 22 of the scanning probe 20 and the surface of the specimen can be more accurately adjusted.

However, when the scanning probe 20 is attached to the tuning fork 10 like in the conventional mechanically-coupled tuning fork 10-scanning probe 20 vibrating system illustrated in FIGS. 1A and 1B, the quality factor of the system is decreased by about 1/20 or less as compared to a natural quality factor of the tuning fork 10, because unbalance occurs in mass of two prongs of the tuning fork 10, a resistive force to be applied to the tuning fork 10 increases and a natural frequency of the conventional mechanically-coupled tuning fork 10-scanning probe 20 vibrating system is different from that of the tuning fork 10 and a loss of energy required for vibration of the conventional mechanically-coupled tuning fork 10-scanning probe 20 vibrating system occurs. In particular, in the NSOM, the scanning probe 20 having a large length is used and thus, a reduction in quality factor is severe. Thus, the distances between the detection tip 22 of the scanning probe 20 and the surface of the specimen may not be accurately adjusted.

In particular, when a biological specimen included in liquid is detected using the vibrating scanning probe 20, due to viscosity of the liquid, a large resistive force is applied to the scanning probe 20 in the liquid. Thus, the quality factor of the conventional mechanically-coupled tuning fork 10-scanning probe 20 vibrating system is greatly decreased, or the tuning fork 10 does not vibrate. In the conventional mechanically-coupled tuning fork 10-scanning probe 20 vibrating system illustrated in FIGS. 1A and 1B, it is difficult to detect the shape of the specimen in the liquid with high resolution.

FIGS. 19 and 20 illustrate a mechanically-coupled tuning fork-scanning probe vibrating system according to comparative examples.

COMPARATIVE EXAMPLE 1

FIG. 19 illustrates a mechanically-coupled tuning fork-scanning probe vibrating system according to a comparative example 1. According to the comparative example 1, after a free end of a scanning probe 20c is fixed at a fixing member 30c, a tuning fork 10c contacts spaces between the fixed portion of the scanning probe 20c and a detection tip to be perpendicular thereto, and then, the highest quality factor of the mechanically-coupled tuning fork-scanning probe vibrating system is searched by adjusting the position of the tuning fork 10c. In this case, as the position of the tuning fork 10c varies, the natural frequency of the scanning probe 20c varies and is proximate to the natural frequency of the tuning fork 10c at a predetermined point so that vibration of the tuning fork 10c occurs briskly and the quality factor of the mechanically-coupled tuning fork-scanning probe vibrating system is increased. However, when the positions of the tuning fork 10c and the scanning probe 20c are optimized and then the tuning fork 10c and the scanning probe 20c are fixed via an adhesive, variation of optimum conditions may occur, and after the tuning fork 10c and the scanning probe 20c are attached to each other under the optimum conditions, the quality factor of the mechanically-coupled tuning fork-scanning probe vibrating system cannot be adjusted, and the method is an optimization method by adjusting the position of the tuning fork 10c and thus, is not easily used in a general scanning probe microscope.

COMPARATIVE EXAMPLE 2

FIG. 20 illustrates a mechanically-coupled tuning fork-scanning probe vibrating system according to a comparative example 2. According to the comparative example 2, the quality factor of the mechanically-coupled tuning fork-scanning probe vibrating system is greatly increased by melting a scanning probe 20a to have a diameter that is equal to or less than 25 µm and by attaching the scanning probe 20a to a tuning fork 10a. However, in this case, it is very difficult to handle the scanning probe 20a, and when the scanning probe 20a is soaked in a medium having high viscosity, vibration may not occur smoothly.

SUMMARY OF THE INVENTION

The present invention provides a mechanically-coupled tuning fork-scanning probe vibrating system in which, in order not to greatly decrease a quality factor of the mechanically-coupled tuning fork-scanning probe vibrating system as compared to that of a tuning fork even when a scanning probe is attached to the tuning fork, a pin-point support and a knife-edge balance contact with a side of the scanning probe, a position in which the pin-point support and the knife-edge balance contact each other is adjusted and vibration characteristics of the mechanically-coupled tuning fork-scanning probe vibrating system are dynamically controlled so that distances between a detection tip of the scanning probe and a surface of a specimen can be accurately adjusted or a detection time can be reduced.

The present invention also provides a mechanically-coupled tuning fork-scanning probe vibrating system in which dynamic vibration control is performed by adjusting a contact position of a contact member including a pin-point support and a knife-edge balance so that, even when a scanning probe is inserted in a medium having high viscosity, a high quality factor of the mechanically-coupled tuning fork-scanning probe vibrating system can be maintained and the shape of a specimen in the medium having high viscosity can be detected and a scanning probe microscope can be used to accurately detect a biological specimen in liquid as well as a specimen in air.

According to an aspect of the present invention, there is provided a mechanically-coupled tuning fork-scanning probe vibrating system, the system including: a tuning fork vibrating due to an AC voltage applied thereto; a scanning probe attached to a side of the tuning fork and vibrating due to the tuning fork; and a contact member contacting a side surface of the scanning probe and adjusting a position of a contact point at which the tuning fork and the scanning probe contact each other, to vary a natural frequency of a combination body in which the tuning fork and the scanning probe are combined with each other.

The contact member may include: a pin-point support contacting a surface of a first side of the scanning probe and being moved in a lengthwise direction of the scanning probe; and a knife-edge balance contacting a surface of a second side of the scanning probe and being moved in the lengthwise direction of the scanning probe between a contact point in which the tuning fork and the scanning probe contact each other, and the pin-point support, and the pin-point support and the knife-edge balance may be supported by a translation stage that is accurately moved in the X, Y, and Z-axis directions.

The scanning probe and the tuning fork may be attached to each other so that a lengthwise direction of the tuning fork and the lengthwise direction of the scanning probe are parallel to each other or perpendicular to each other. A detection tip that corresponds to an end of the scanning probe may be inserted in a medium having viscosity so as to detect optical characteristics of a specimen soaked in the medium having viscosity.

The tuning fork may include a detection circuit installed therein and detecting amplitude and phase of the tuning fork and may be formed of silicon oxide ($SiO_2$), and the scanning probe may have an approximately beam shape having predetermined cross-section and length and formed of glass or optical fiber, and the first side of the scanning probe that faces a specimen may be a detection tip having a cross-sectional size of several microns or equal to or less than several microns.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
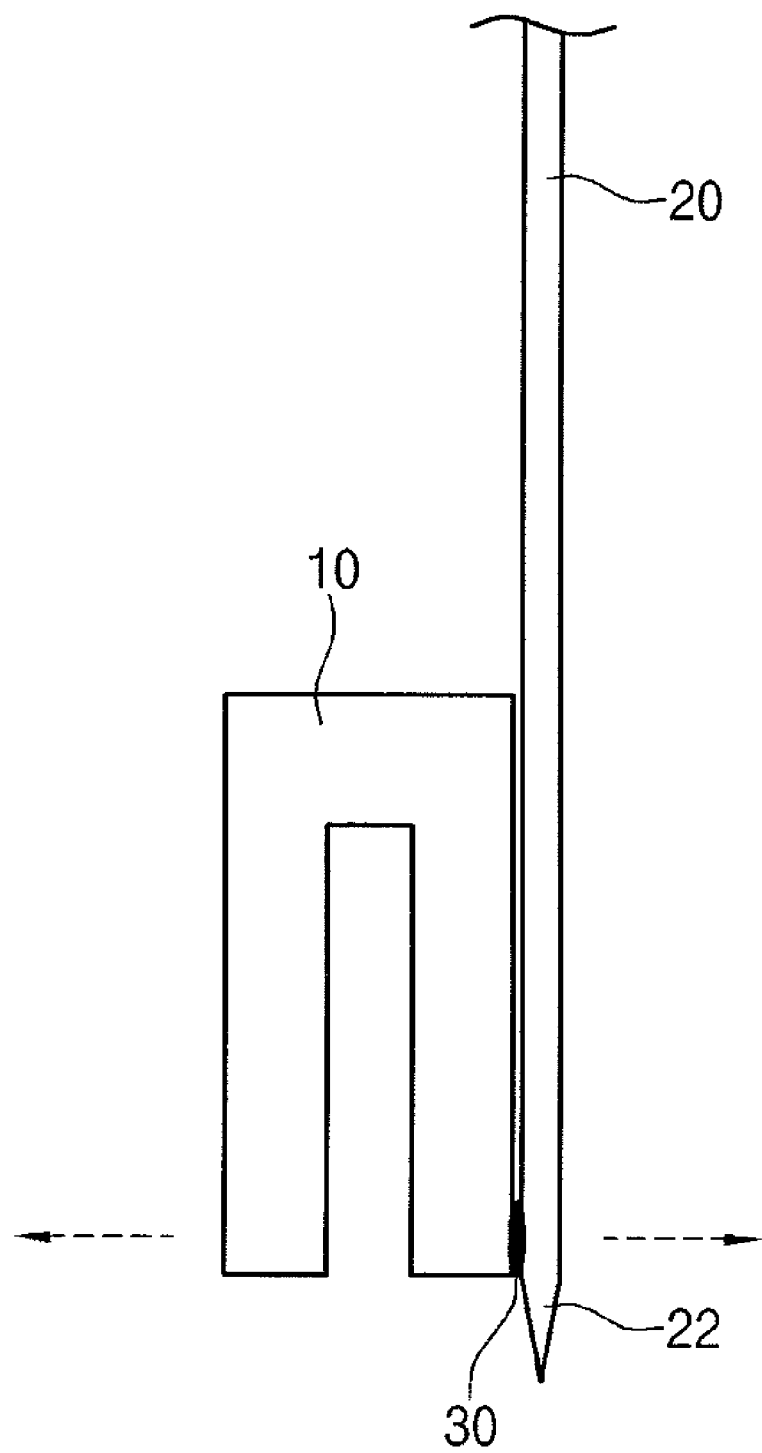
FIGS. 1A and 1B schematically illustrate a conventional mechanically-coupled tuning fork-scanning probe vibrating system.
Figure 1B:
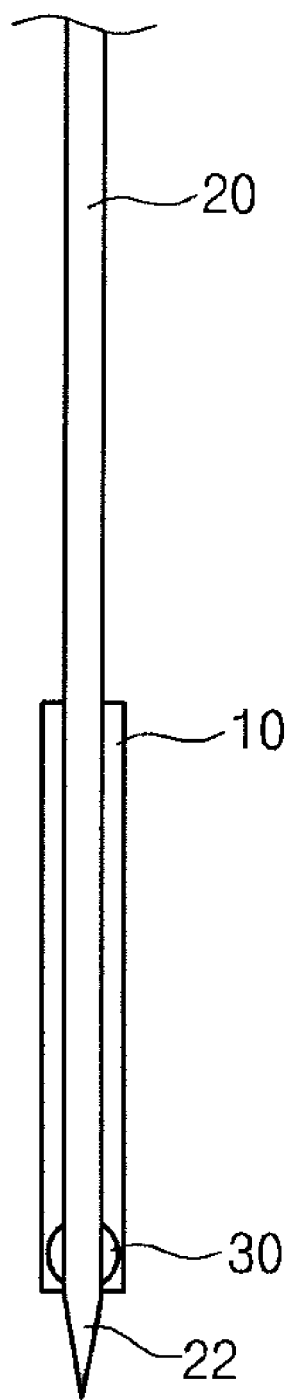
Figure 2:
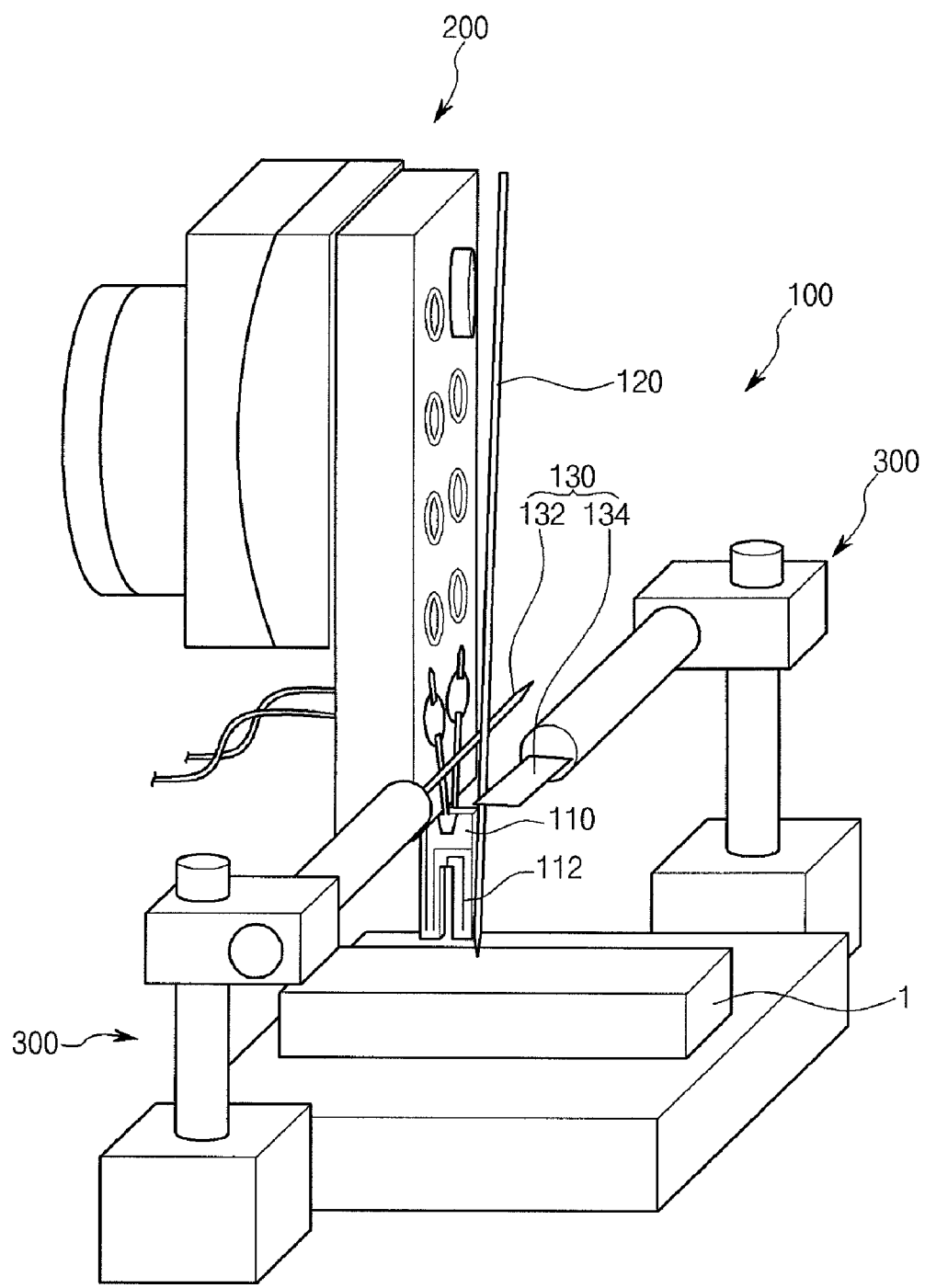
FIG. 2 is a perspective view of a mechanically-coupled tuning fork-scanning probe vibrating system according to an embodiment of the present invention.
Figure 3:
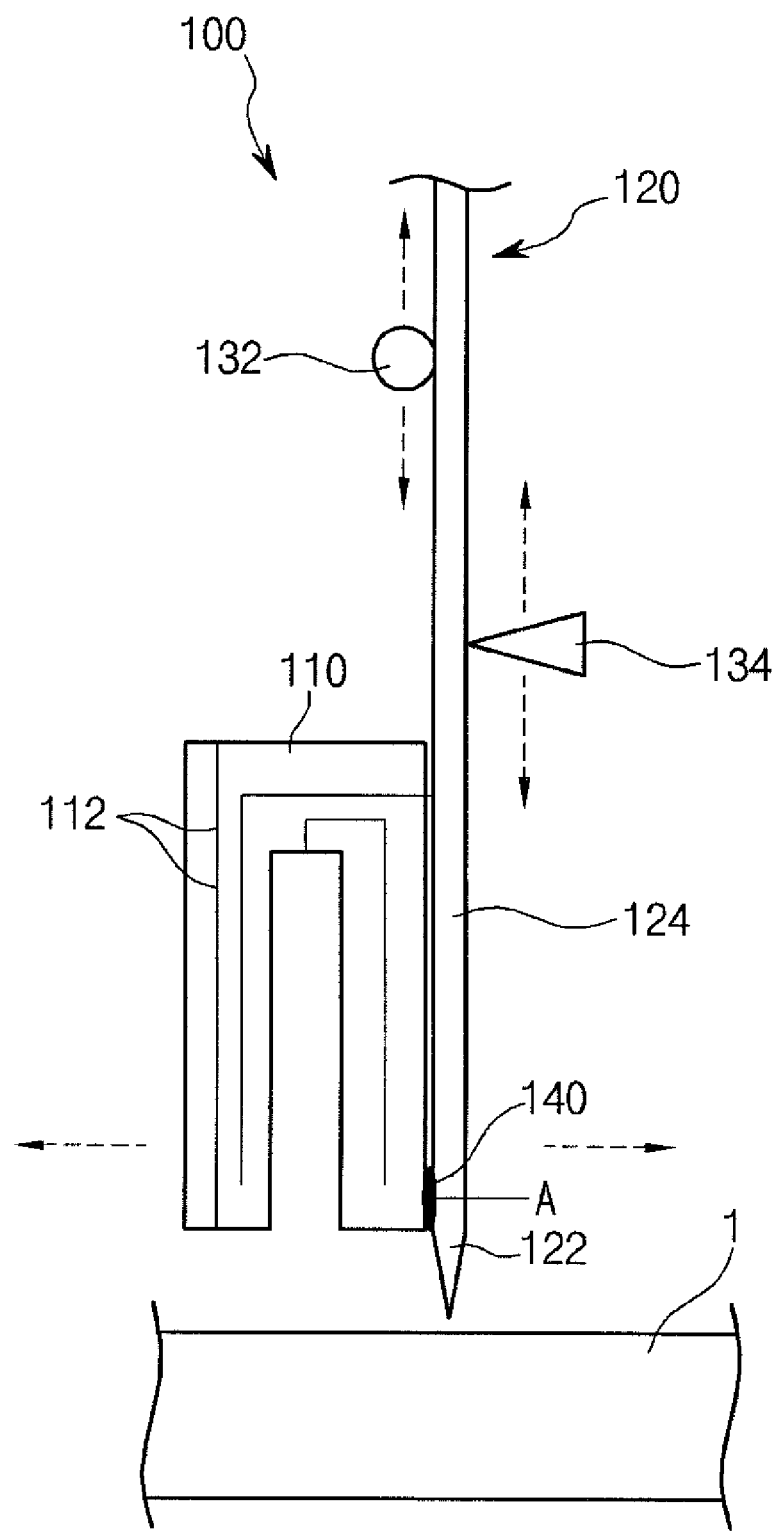
FIGS. 3 and 4 are respectively a front view and a side view of a tuning fork, a scanning probe, and a contact member of the mechanically-coupled tuning fork-scanning probe vibrating system illustrated in FIG. 2.
Figure 4:
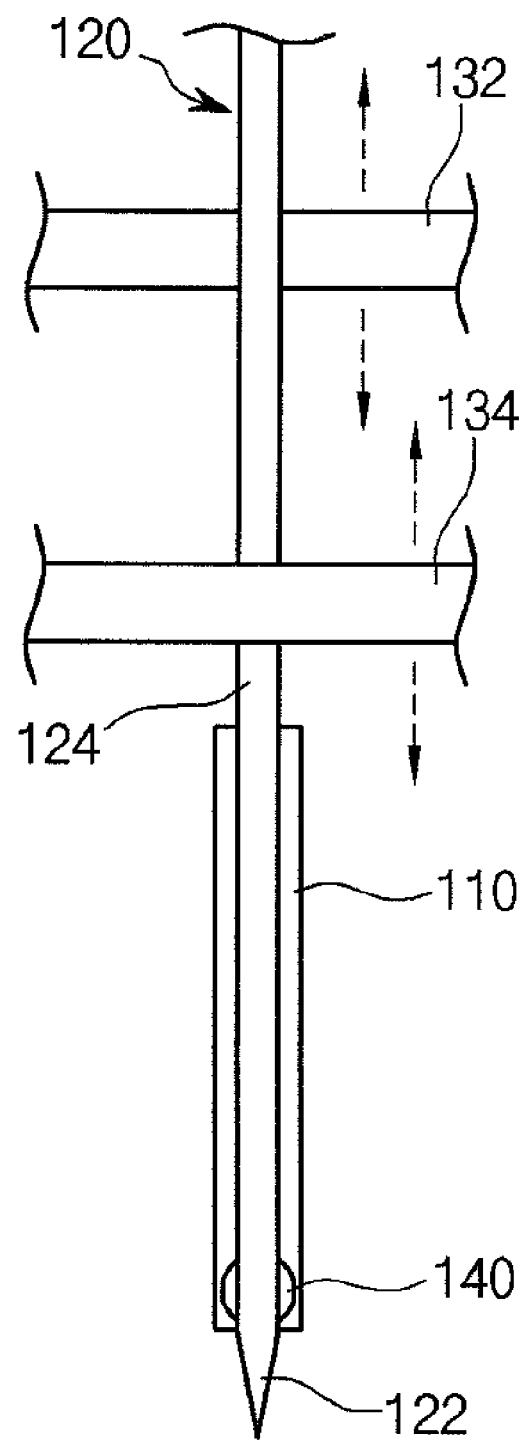

FIG. 2 is a perspective view of a mechanically-coupled tuning fork-scanning probe vibrating system 100 according to an embodiment of the present invention, and FIGS. 3 and 4 are respectively a front view and a side view of a tuning fork, a scanning probe, and a contact member of the mechanically-coupled tuning fork-scanning probe vibrating system 100 illustrated in FIG. 2.

Referring to FIG. 2, the mechanically-coupled tuning fork-scanning probe vibrating system 100 according to the present embodiment includes a tuning fork 110 that vibrates due to an AC voltage applied to the tuning fork 110, a scanning probe 120 that is attached to a side of the tuning fork 110, a contact member 130 that contacts the scanning probe 120 to vary a natural frequency of a combination body in which the tuning fork 110 and the scanning probe 120 are combined with each other, and two translation stages 30c that support the contact member 130.

Referring to FIGS. 3 and 4, the tuning fork 110 has a shape including prongs divided into two parts and may be a quartz oscillator formed of silicon oxide ($SiO_2$). However, the present invention is not limited thereto, and the tuning fork 110 may be a quartz oscillator having other shape such as PZT or rod-shaped tuning fork that serves as the tuning fork 110. Also, a detection circuit 112 is installed in the tuning fork 110 so as to detect amplitude and phase of the tuning fork 110. When an AC voltage having a predetermined frequency is applied to the tuning fork 110, the tuning fork 110 vibrates while its two prongs shut and open repeatedly, and vibration is detected by the detection circuit 112, and the detection circuit 112 transmits an electrical signal to an external detection device (not shown). The detection circuit 112 may be a unit that detects amplitude and phase of the tuning fork 110. Similarly, the external detection device may be a device that detects the electrical signal output from the detection circuit 112. The detection circuit 112 and the external detection device are general devices that are well known to one of ordinary skill in the art, and thus a detailed description thereof will not be provided here.

The scanning probe 120 has a beam shape of a cross-section having a predetermined size and having a larger length than the cross-section. A first side of the scanning probe 120 that faces a specimen 1 may be a detection tip 122 having a cross-sectional size of several microns or equal to or less than several microns, and a second side of the scanning probe 120 may be a free end 124 having a relatively larger cross-sectional size than the detection tip 122.

The tuning fork 110 and the scanning probe 120 are attached to each other via an adhesive 140. Specifically, the scanning probe 120 is attached to one side of one of the two prongs of the tuning fork 110 so that a length of about 1 mm of the detection tip 122 of the scanning probe 120 is exposed from a contact point A at which the tuning fork 110 and the scanning probe 120 contact each other.

The contact member 130 contacts the contact point A while having a very small contact surface with respect to the surface of the free end 124 of the scanning probe 120 and varies the natural frequency of the scanning probe 120 and the natural frequency of a combination body in which the tuning fork 110 and the scanning probe 120 are combined with each other. In this case, the contact member 130 can freely adjust the position of the contact point A in the lengthwise direction of the scanning probe 120 at the free end 124 of the scanning probe 120. Thus, the natural frequency of the scanning probe 120 and the natural frequency of the combination body in which the tuning fork 110 and the scanning probe 120 are combined with each other, can vary. Also, the contact member 130 may contact the scanning probe 120 by adjusting contact pressure applied to the scanning probe 120.

The contact member 130 may contact and may be supported at both sides of the scanning probe 120 so as to more accurately control the vibration characteristics of the tuning fork 110 and the scanning probe 120. Thus, the contact member 130 includes a pin-point support 132 that contacts the first side of the scanning probe 120 and performs a pin point function and a knife-edge balance 134 that contacts the second side of the scanning probe 120, wherein the second side faces the first side of the scanning probe 120. In this case, the knife-edge balance 134 may be disposed between the pin-point support 132 and the contact point A. Furthermore, the knife-edge balance 134 is disposed at an opposite side to the contact point A based on the scanning probe 120 so that the scanning probe 120 to which contact pressure is applied by the knife-edge balance 134 can be pressurized toward the tuning fork 110 and the pin-point support 132 can be disposed at an opposite side to the knife-edge balance 134 based on the scanning probe 120. This is because, when the position of the knife-edge balance 134 is opposite to the pin-point support 132, minute pressure at which the scanning probe 120 falls from (is far away from) the tuning fork 110 is applied to the knife-edge balance 134 so that vibration characteristics of the tuning fork 110 can be controlled, the quality factor of the tuning fork 110 can lower and a loss of energy of the tuning fork 110 can be increased due to the scanning probe 120.

The pin-point support 132 is disposed at an opposite side to the knife-edge balance 134 so that it can be well fixed without variation of positions with respect to ambient conditions such as wind, vibration, or the like.

Each of the pin-point support 132 and the knife-edge balance 134 may be supported by each translation stage 30c that is accurately moved in the X, Y, and Z-axis directions so that the contact position with respect to the scanning probe 120 can be accurately moved. However, the present invention is not limited thereto. A unit that supports the pin-point support 132 and the knife-edge balance 134 and is accurately moved to the scanning probe 120 may be used. Each translation stage 30c is a general transfer device, and a detailed description thereof will not be provided here.

An operation of the mechanically-coupled tuning fork-scanning probe vibrating system 100 illustrated in FIG. 2 will now be described.

In the mechanically-coupled tuning fork-scanning probe vibrating system 100 of FIG. 2, the detection tip 122 of the scanning probe 120 that is attached to the tuning fork 110 and vibrates is proximate to the surface of the specimen 1 to be observed, and variation of shear forces that act between the scanning probe 120 and the specimen 1 is detected by the detection circuit 112 of the tuning fork 110, and distances between the scanning probe 120 and the surface of the specimen 1 are calculated and adjusted to a nanometer scale, and the vibration characteristics of the scanning probe 120 attached to the tuning fork 110 are dynamically controlled so that the quality factor of the mechanically-coupled vibration tuning fork 110-scanning probe 120 system 100 can be increased and the scanning probe 120 can vibrate freely without being affected by viscosity of a medium that constitutes an ambient environment.

In the case that the vibration characteristics of the scanning probe 120 are dynamically controlled, referring to FIG. 2, the pin-point support 132 and the knife-edge balance 134 contact the scanning probe 120 attached to the tuning fork 110 so that the vibration characteristics of the tuning fork 110 and the scanning probe 120 can be dynamically controlled under new boundary conditions and the natural frequency of the mechanically-coupled tuning fork 110-scanning probe 120 vibrating system 100 can be adjusted and the quality factor thereof can be increased. In this case, the contact position of the pin-point support 132 and the knife-edge balance 134 can be adjusted so that the quality factor of the mechanically-coupled tuning fork 110-scanning probe 120 vibrating system 100 can be actively controlled.

In the case that the vibration characteristics of the mechanically-coupled tuning fork 110-scanning probe 120 vibrating system 100 are dynamically controlled using the pin-point support 132 and the knife-edge balance 134, first, the pin-point support 132 and the knife-edge balance 134 dynamically control the vibration characteristics of the tuning fork 110 to which the scanning probe 120 is attached, so that the tuning fork 110 can vibrate freely without being affected by viscosity of a medium that constitutes an ambient environment and the natural frequency of the mechanically-coupled tuning fork 10-scanning probe 20 vibrating system 100 that is generated during detection can be identical to the natural frequency of the tuning fork 110. Even when the specimen 1 is included in the medium having high viscosity, the quality factor of the tuning fork 110 is maintained at a high level so that the specimen 1 can be detected, and the distances between the scanning probe 120 and the surface of the specimen 1 can be accurately adjusted, and thus, the specimen 1 included in the medium having high viscosity can be detected with high resolution. A description of the specimen 1 included in the medium having high viscosity will be made later.

In the mechanically-coupled tuning fork-scanning probe vibrating system 100 illustrated in FIG. 2, the quality factor of the tuning fork 110 may be increased via the contact member 130, and the scanning time of the scanning probe 120 of the scanning probe microscope may be reduced by reducing the quality factor of the tuning fork 110 according to the purpose of detection. In an embodiment of the present invention, the quality factor of the tuning fork 110 can be actively controlled via the contact member 130.

In other words, the contact member 130 allows the pin-point support 132 to contact a first side of the free end 124 disposed above the contact point A of the scanning probe 120 and the knife-edge balance 134 to contact spaces between the contact point A and the pin-point support 132 at a second side of the free end 124 of the scanning probe 120. In this case, the pin-point support 132 and the knife-edge balance 134 allow the position of the contact point A to be moved in the lengthwise direction of the scanning probe 120 and can adjust the position of the contact point A of the pin-point support 132 and the knife-edge balance 134 so that predetermined boundary conditions are set in such a way that the resonant frequency of the scanning probe 120 varies. Furthermore, contact pressure applied to the scanning probe 120 by the pin-point support 132 and the knife-edge balance 134 can be adjusted.

The mechanically-coupled tuning fork-scanning probe vibrating system 100 illustrated in FIG. 2 uses characteristics that the tuning fork 110 vibrates in a transverse direction. Thus, vibration is interpreted by applying a transverse vibration theory of beams. The mechanically-coupled tuning fork-scanning probe vibrating system 100 illustrated in FIG. 2 is interpreted as a five-beam combination system in which two beams of the tuning fork 110 and three beams of the scanning probe 120 are combined with one another. Here, the five beams involve two prongs of the tuning fork 110, a beam between the contact point A and the detection tip 122 of the scanning probe 120, a beam between the contact point A and the knife-edge balance 134, and a beam between the knife-edge balance 134 and the pin-point support 132.

Here, in the transversely-vibrating beams, transverse vibration amplitude with respect to a length component l is expressed using Equation: $U(l)=a \cos(\beta l)+b \sin(\beta l)+c \cosh(\beta l)+d \sinh(\beta l)$. Here, $\beta^4=\omega_R^2 \rho S/EI$, wherein $\omega_R$ is a resonant frequency, $\rho$ is a density, S is a cross-sectional area, E is a Young's modulus, and I is a moment of inertia. 20 boundary conditions are set by deriving five equations with respect to transverse vibration amplitude of the five beams of the mechanically-coupled tuning fork-scanning probe vibrating system 100 illustrated in FIG. 2 from the above Equation and by substituting variables of the tuning fork 110 and the scanning probe 120 for the five equations. The boundary conditions that the scanning probe 120 is disposed between the pin-point support 132 and the knife-edge balance 134, from among the 20 boundary conditions are as below.

Two boundary conditions at the position of the pin-point support 132 are $U_1(0)=0$ and $U_1''(0)=0$, and four boundary conditions at the position of the knife-edge balance 134 are $U_1(l_1)=0$, $U_2(l_1)=0$, $U_1''(l_1)-U_2''(l_1)$, and $U_1'''(l_1)-U_2'''(l_1)$. Here, $U_1$ is equation with respect to transverse vibration amplitude of the beam between the knife-edge balance 134 and the pin-point support 132, and $U_2$ is equation with respect to transverse vibration amplitude of the beam between the contact point A and the knife-edge balance 134, and $l_1$ is the length from the pin-point support 132 to the knife-edge balance 134.

Figure 13A:
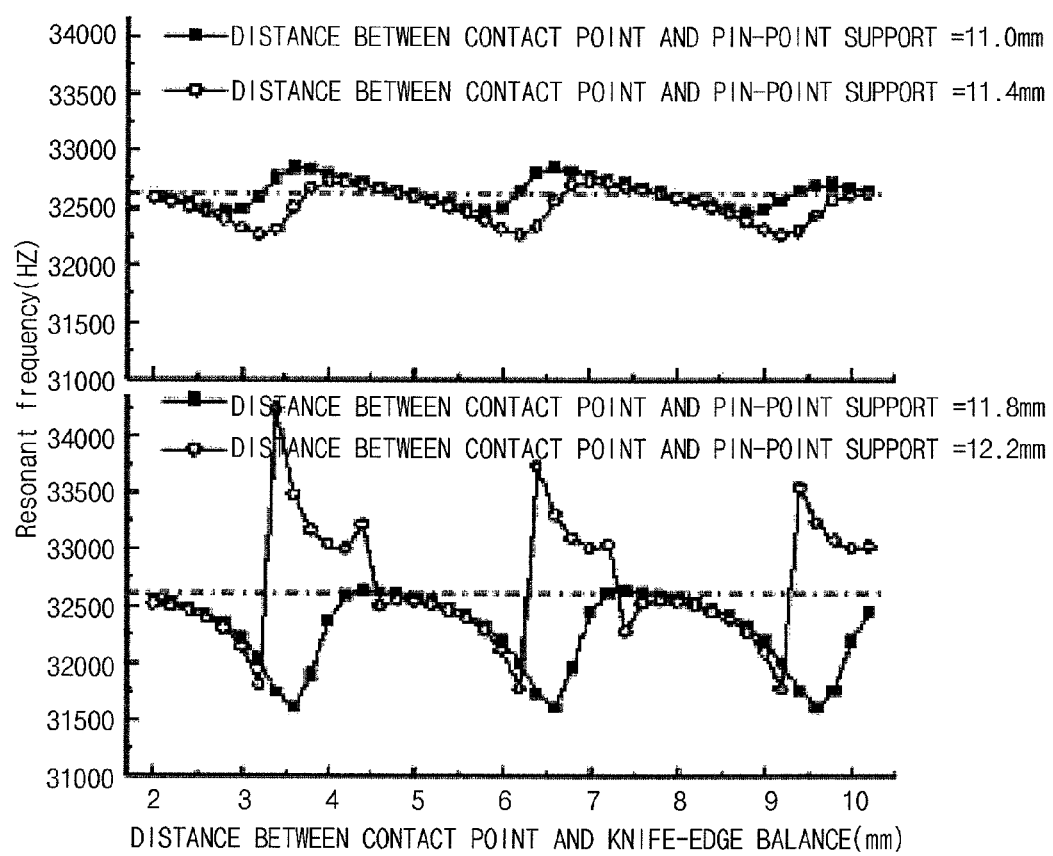
FIGS. 13A and 13B are graphs showing theoretical calculation of variation of resonant frequencies of the mechanically-coupled tuning fork-scanning probe vibrating system of FIG. 2 by modeling the tuning fork and the scanning probe of the mechanically-coupled tuning fork-scanning probe vibrating system of FIG. 2.
Figure 13B:
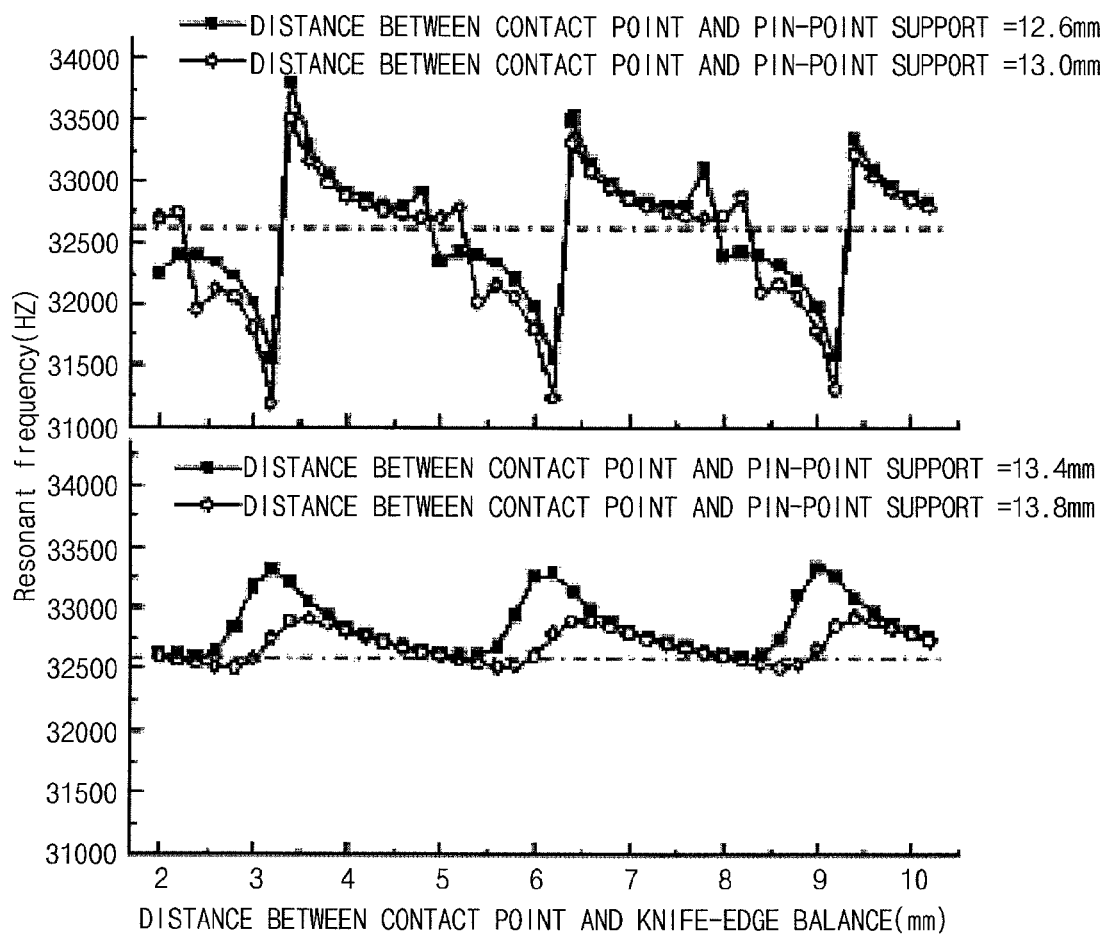

The shape of variation of resonant frequencies of the mechanically-coupled tuning fork-scanning probe vibrating system 100 illustrated in FIG. 2 that varies according to the position of the knife-edge balance 134 is determined by the position of the pin-point support 132 to which new boundary conditions according to the present embodiment are applied. In other words, whether the resonant frequency of the mechanically-coupled tuning fork-scanning probe vibrating system 100 illustrated in FIG. 2 that varies according to the position of the knife-edge balance 134 involves a single mode or two modes is determined by the position of the pin-point support 132, as illustrated in FIGS. 13A and 13B, which are graphs showing theoretical calculation of vibration characteristics of a combination structure of the tuning fork 110 and the scanning probe 120 in which the pin-point support 132 and the knife-edge balance 134 of the mechanically-coupled tuning fork-scanning probe vibrating system 100 shown in FIG. 2 are disposed, and thus, a detailed description thereof will be provided later.

Thus, in the mechanically-coupled tuning fork-scanning probe vibrating system 100 illustrated in FIG. 2, when the scanning probe 120 and the tuning fork 110 are attached to each other, the pin-point support 132 and the knife-edge balance 134 contact a designated position of the first side of the free end 124 that is opposite to the detection tip 122 of the scanning probe 120, so that the distances between the scanning probe 120 and the surface of the specimen 1 can be accurately adjusted. Thus, the mechanically-coupled tuning fork-scanning probe vibrating system 100 illustrated in FIG. 2 may be easily used in a general scanning probe microscope.

Also, the mechanically-coupled tuning fork-scanning probe vibrating system 100 illustrated in FIG. 2 controls its quality factor actively. Thus, the quality factor of the mechanically-coupled tuning fork-scanning probe vibrating system 100 illustrated in FIG. 2 can be increased so that the distances can be accurately adjusted. When fast detection is required, the quality factor of the mechanically-coupled tuning fork-scanning probe vibrating system 100 illustrated in FIG. 2 may be decreased. Here, in connection with the correlation of the quality factor, accurate distance adjustment and a detection time, the high quality factor of the mechanically-coupled tuning fork-scanning probe vibrating system 100 illustrated in FIG. 2 enables accurate distance adjustment but causes a scanning time to increase, because, when vibration of the tuning fork 110 is reduced and the tuning fork 110 is stabilized due to an external cause, a stabilization time $\tau$ satisfies $\tau=Q/\omega_0$.

Here, $\omega_0$ is a resonant frequency of the tuning fork 110. Thus, when the specimen 1 having a large area is detected or fast detection is required due to variation of states of the specimen 1, a low quality factor may be used. Thus, the mechanically-coupled tuning fork-scanning probe vibrating system 100 illustrated in FIG. 2 can be widely used in various fields regardless of the characteristics of the medium of the specimen 1.

As described above, in the mechanically-coupled tuning fork-scanning probe vibrating system 100 illustrated in FIG. 2, the pin-point support 132 and the knife-edge balance 134 are set to have predetermined boundary conditions on the surface of the scanning probe 120 attached to the tuning fork 110 via the adhesive 140 so that the contact position of the pin-point support 132 and the knife-edge balance 134 varies in a lengthwise direction of the free end 124 of the scanning probe 120 and the natural frequency of the scanning probe 120 can vary. Thus, a combination effect of natural frequencies of the tuning fork 110 and the scanning probe 120 varies. The resonant frequency of a combination body in which the tuning fork 110 and the scanning probe 120 are combined with each other so that the maximum combination effect can be obtained, is pursued so that the quality factor of the mechanically-coupled tuning fork-scanning probe vibrating system 100 illustrated in FIG. 2 can be increased by 20 times as compared to a conventional mechanically-coupled tuning fork-scanning probe vibrating system.

The mechanically-coupled tuning fork-scanning probe vibrating system 100 illustrated in FIG. 3 is in a shear force mode in which the scanning probe 120 is attached to the tuning fork 110 in such a way that the lengthwise direction of the scanning probe 120 is parallel to the lengthwise direction of one of the two prongs of the tuning fork 110 and the scanning probe 120 vibrates in a horizontal direction with respect to the surface of the specimen 1. However, the present invention is not limited thereto. The mechanically-coupled tuning fork-scanning probe vibrating system 100 illustrated in FIG. 3 may be in a tapping mode in which the contact point A at which the scanning probe 120 and the tuning fork 110 contact each other varies or the scanning probe 120 is attached to the tuning fork 110 in such a way that the lengthwise direction of the scanning probe 120 is perpendicular to the lengthwise direction of one of the two prongs of the tuning fork 110 and the scanning probe 120 vibrates in a vertical direction with respect to the surface of the specimen 1.

Figure 5:
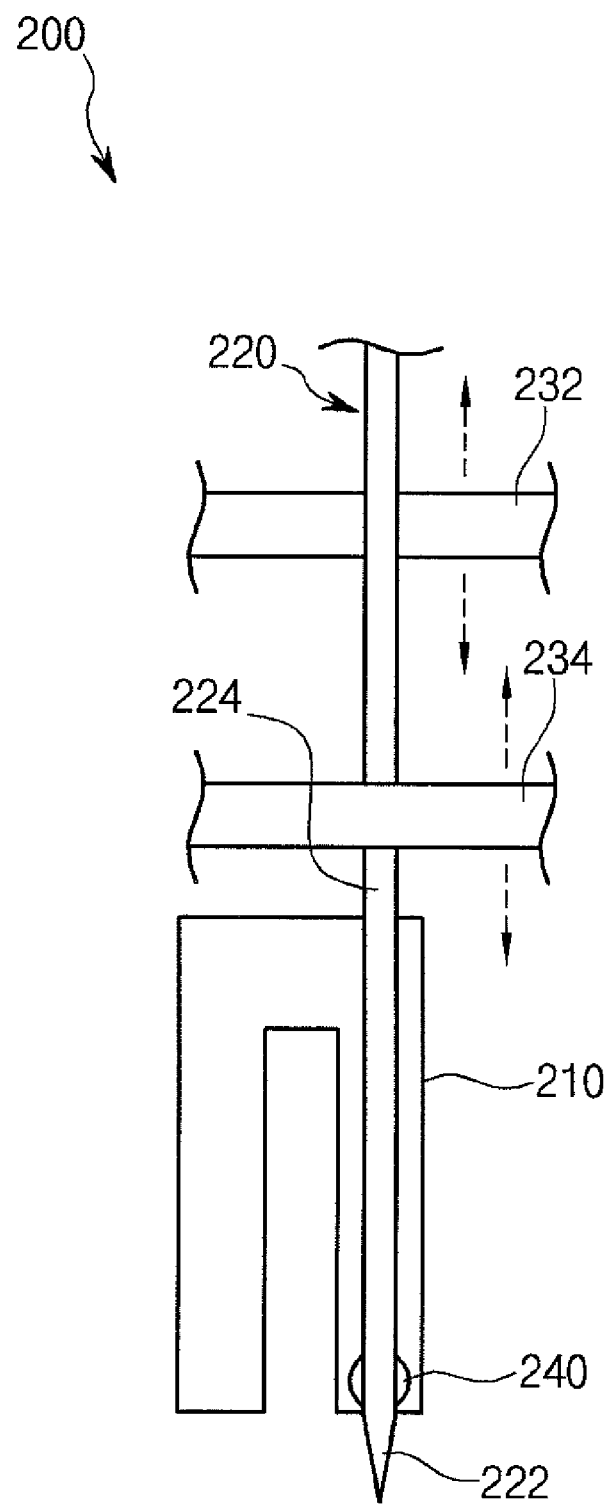
FIGS. 5 and 6 are respectively a front view and a side view illustrating the case that a scanning probe is attached to a front surface of a tuning fork, wherein the scanning probe and the tuning fork are included in a mechanically-coupled tuning fork-scanning probe vibrating system according to another embodiment of the present invention.
Figure 6:
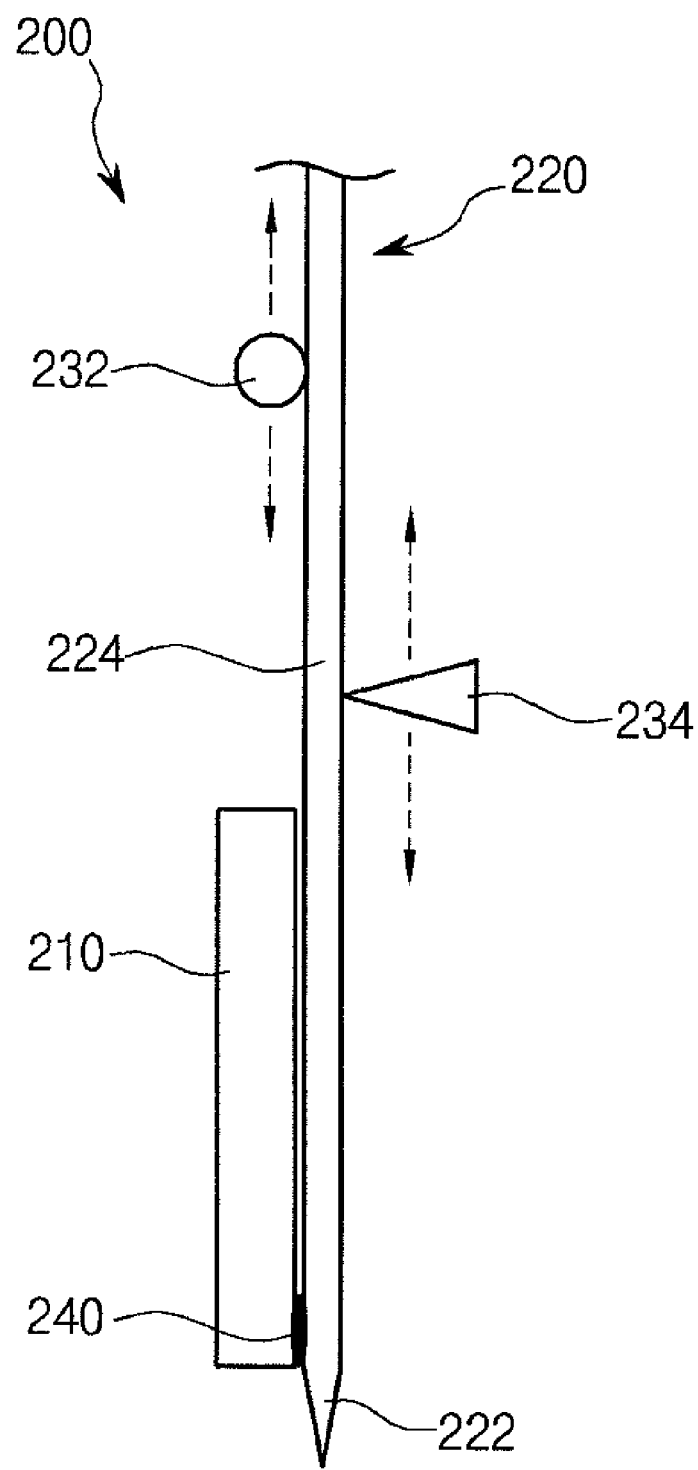
Figure 7:
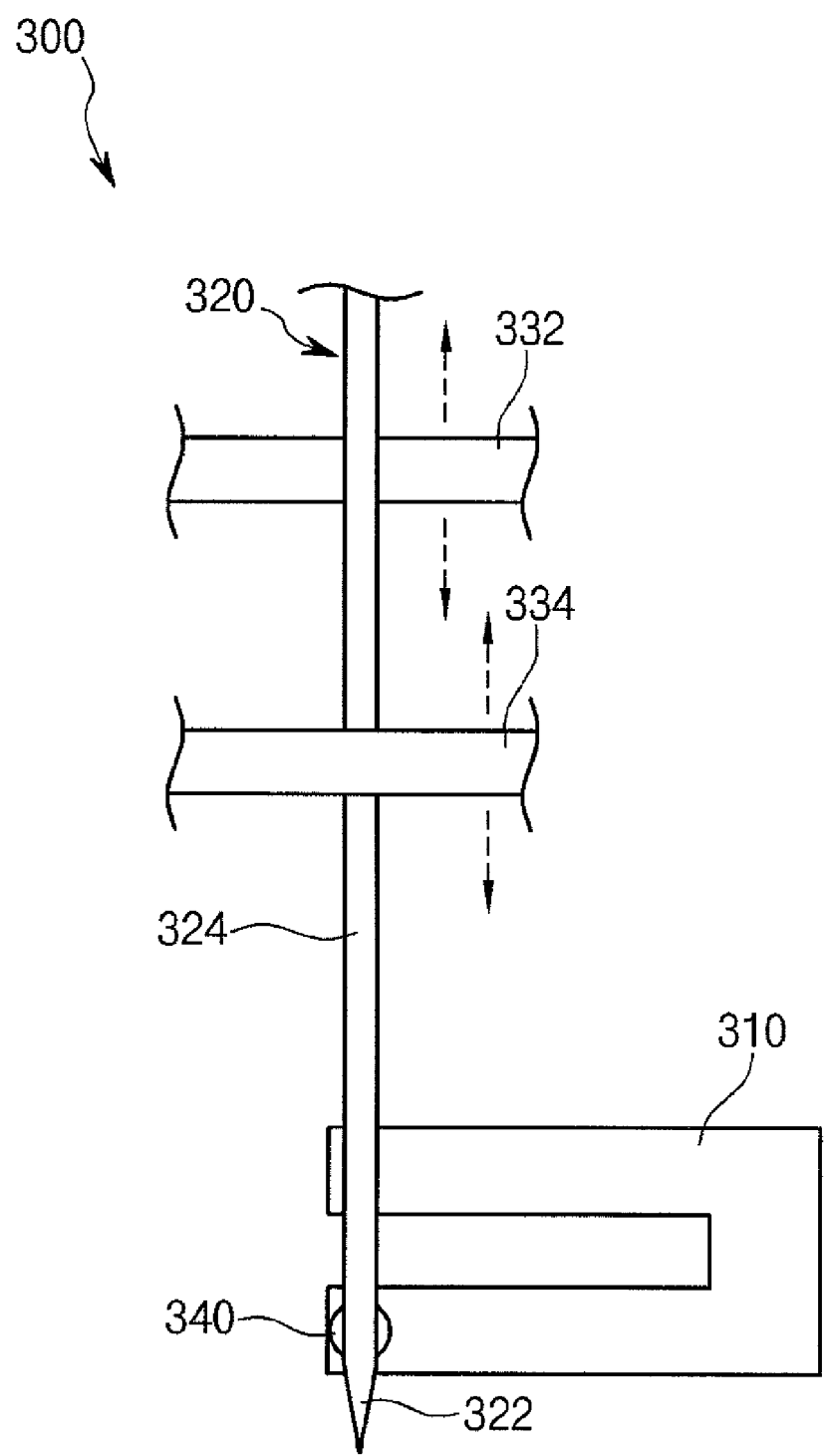
FIGS. 7 and 8 are respectively a front view and a side view illustrating the case that a scanning probe and a tuning fork are attached to be perpendicular to each other, wherein the scanning probe and the tuning fork are included in a mechanically-coupled tuning fork-scanning probe vibrating system according to another embodiment of the present invention.
Figure 8:
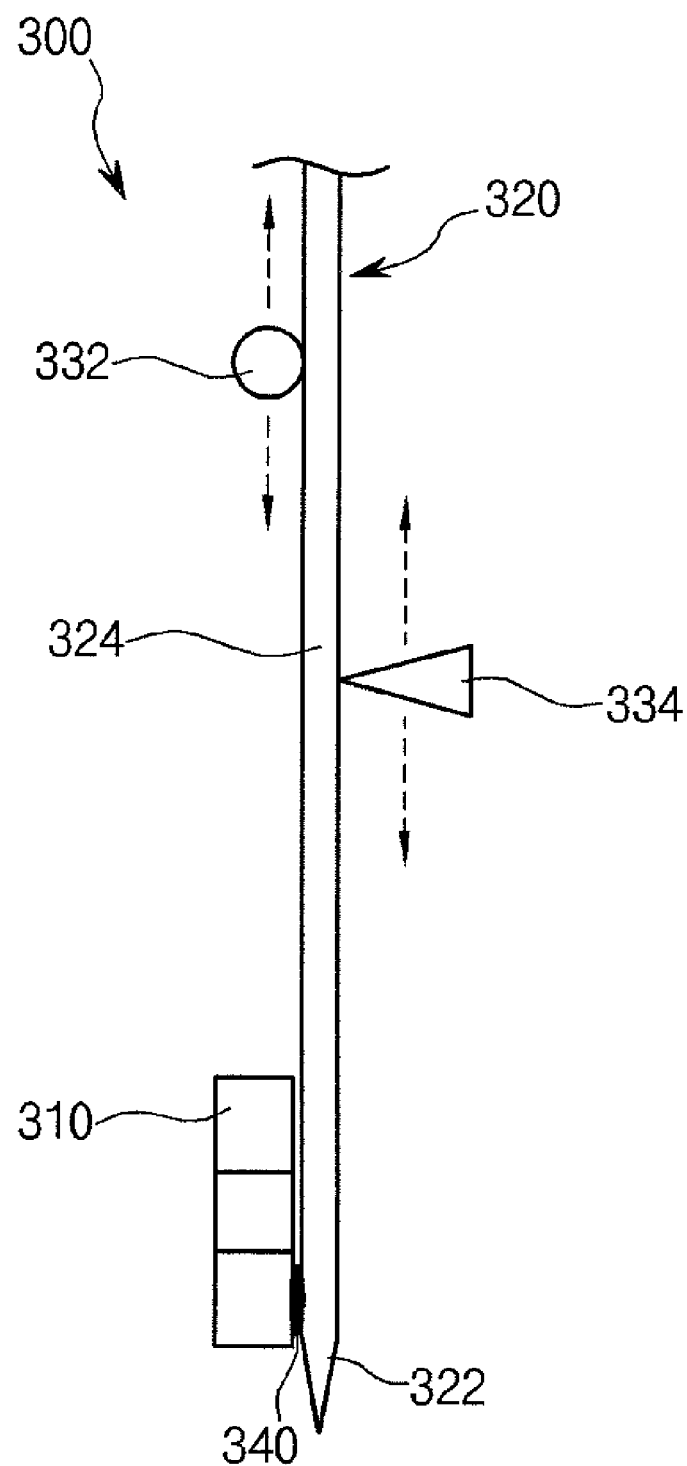
Figure 9:
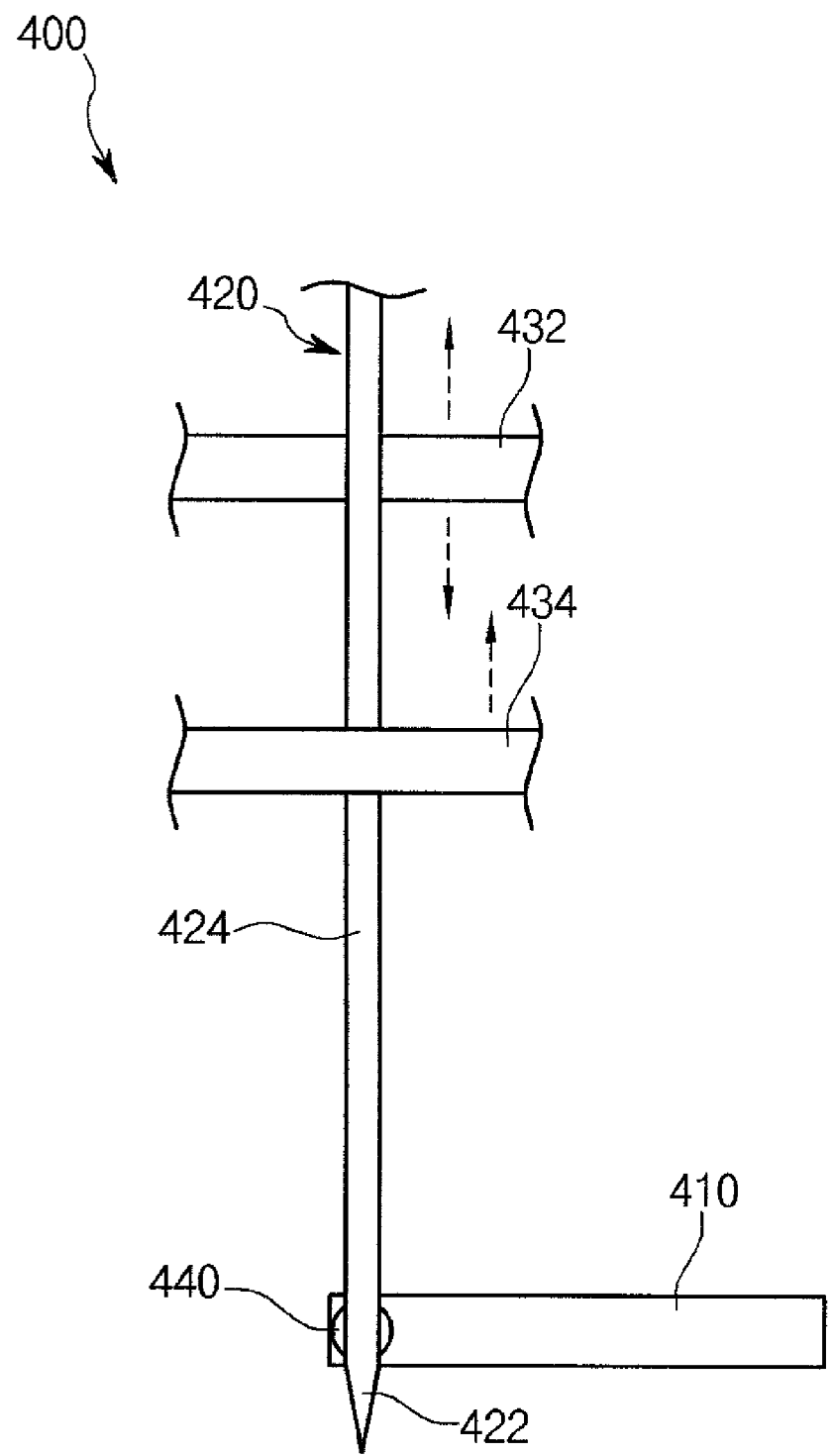
FIGS. 9 and 10 are respectively a front view and a side view illustrating the case that a scanning probe is attached to a side surface of a tuning fork, wherein the scanning probe and the tuning fork are included in a mechanically-coupled tuning fork-scanning probe vibrating system according to another embodiment of the present invention.
Figure 10:
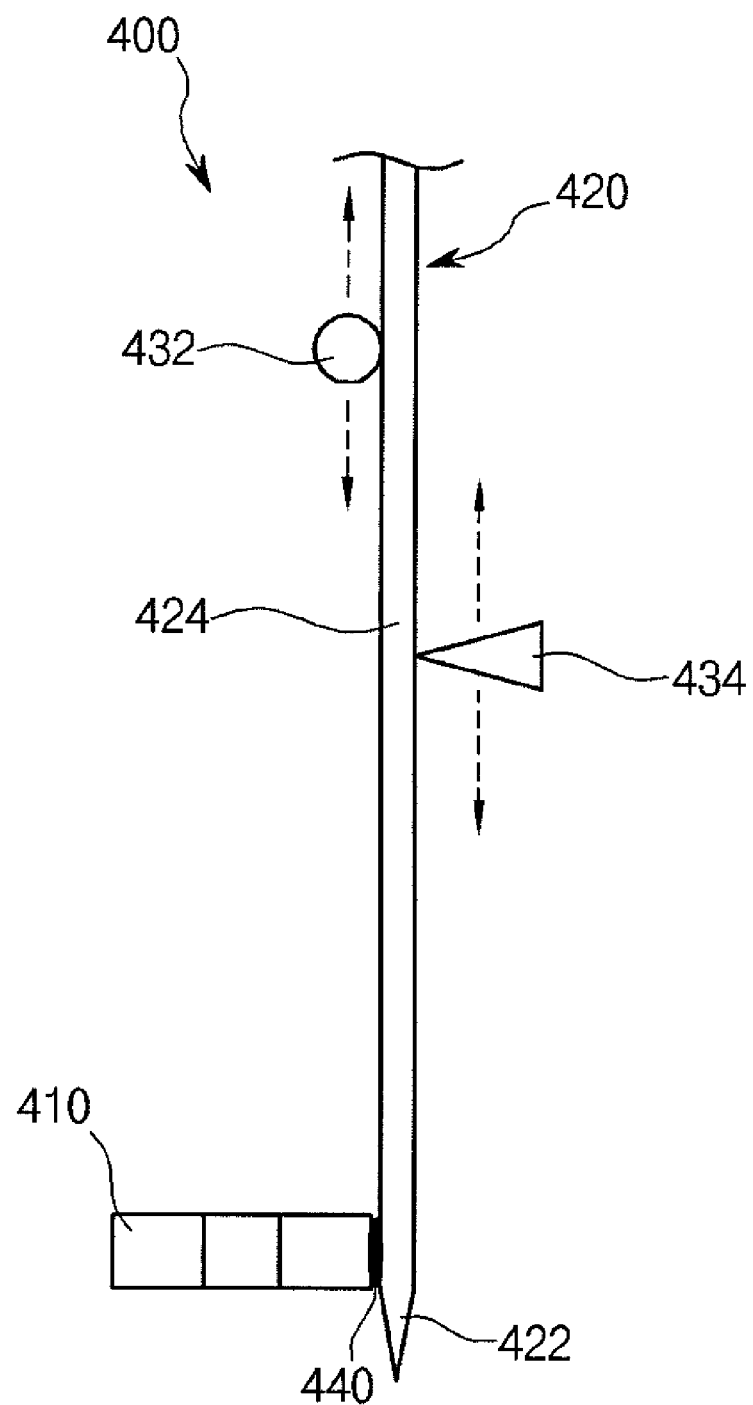

FIGS. 5 and 6 are respectively a front view and a side view illustrating the case that a scanning probe is attached to a front surface of a tuning fork, wherein the scanning probe and the tuning fork are included in a mechanically-coupled tuning fork-scanning probe vibrating system 200 according to another embodiment of the present invention, and FIGS. 7 and 8 are respectively a front view and a side view illustrating the case that a scanning probe and a tuning fork are attached to be perpendicular to each other, wherein the scanning probe and the tuning fork are included in a mechanically-coupled tuning fork-scanning probe vibrating system 300 according to another embodiment of the present invention, and FIGS. 9 and 10 are respectively a front view and a side view illustrating the case that a scanning probe is attached to a side surface of a tuning fork, wherein the scanning probe and the tuning fork are included in a mechanically-coupled tuning fork-scanning probe vibrating system 400 according to another embodiment of the present invention.

Referring to FIGS. 5 and 6, the mechanically-coupled tuning fork-scanning probe vibrating system 200 is in a shear force mode in which a scanning probe 220 is attached to one of two prongs of a tuning fork 210 in such a way that the lengthwise direction of the scanning probe 220 and the lengthwise direction of one of the prongs of the tuning fork 210 are parallel to each other and the scanning probe 220 vibrates in a horizontal direction with respect to the surface of a specimen. In FIGS. 5 and 6, the scanning probe 220 does not contact a lower part of a side surface of the tuning fork 210, as shown in FIG. 2, but contacts a lower part of a front surface of the tuning fork 210.

FIGS. 7 through 10 respectively illustrate a mechanically-coupled tuning fork-scanning probe vibrating system 300 and a mechanically-coupled tuning fork-scanning probe vibrating system 400 according to other embodiments of the present invention. The mechanically-coupled tuning fork-scanning probe vibrating system 300 or 400 is in a tapping mode in which a scanning probe 320 or 420 is attached to one of two prongs of a tuning fork 310 or 410 in such a way that the lengthwise direction of the scanning probe 320 or 420 is perpendicular to the lengthwise direction of one of the two prongs of the tuning fork 310 or 410 and the scanning probe 320 or 420 vibrates in a vertical direction with respect to the surface of a specimen. More specifically, FIGS. 7 and 8 illustrate the case that the scanning probe 320 is attached to a lower part of a front surface of the tuning fork 310, and FIGS. 9 and 10 illustrate the case that the scanning probe 420 is attached to a lower part of a side surface of the tuning fork 410. In the case that the scanning probe 420 is attached to the lower part of the side surface of the tuning fork 410, when the mechanically-coupled tuning fork-scanning probe vibrating system 400 is in the tapping mode and even when the tuning fork 410 and the scanning probe 420 are fixed in the vertical direction, vibration amplitude of the prong of the tuning fork 410 is very small, that is, equal to or less than 0.4 nm. Thus, dynamic vibration control via a pin-point support 332 or 432 and a knife-edge balance 334 or 434 can be stably performed.

Detailed descriptions of each tuning fork 210, 310 or 410, each scanning probe 220, 320 or 420, each knife-edge balance 234, 334 or 434, and each pin-point support 232, 332 or 432 of each mechanically-coupled tuning fork-scanning probe vibrating system 200, 300 or 400 shown in FIGS. 5 through 10 are substantially the same as those of the tuning fork 110, the scanning probe 120, the knife-edge balance 134, and the pin-point support 132 of the mechanically-coupled tuning fork-scanning probe vibrating system 100 shown in FIG. 2 and thus, descriptions of structure and operation of each mechanically-coupled tuning fork-scanning probe vibrating system 200, 300 or 400 shown in FIGS. 5 through 10 will not be provided here.

Figure 11:
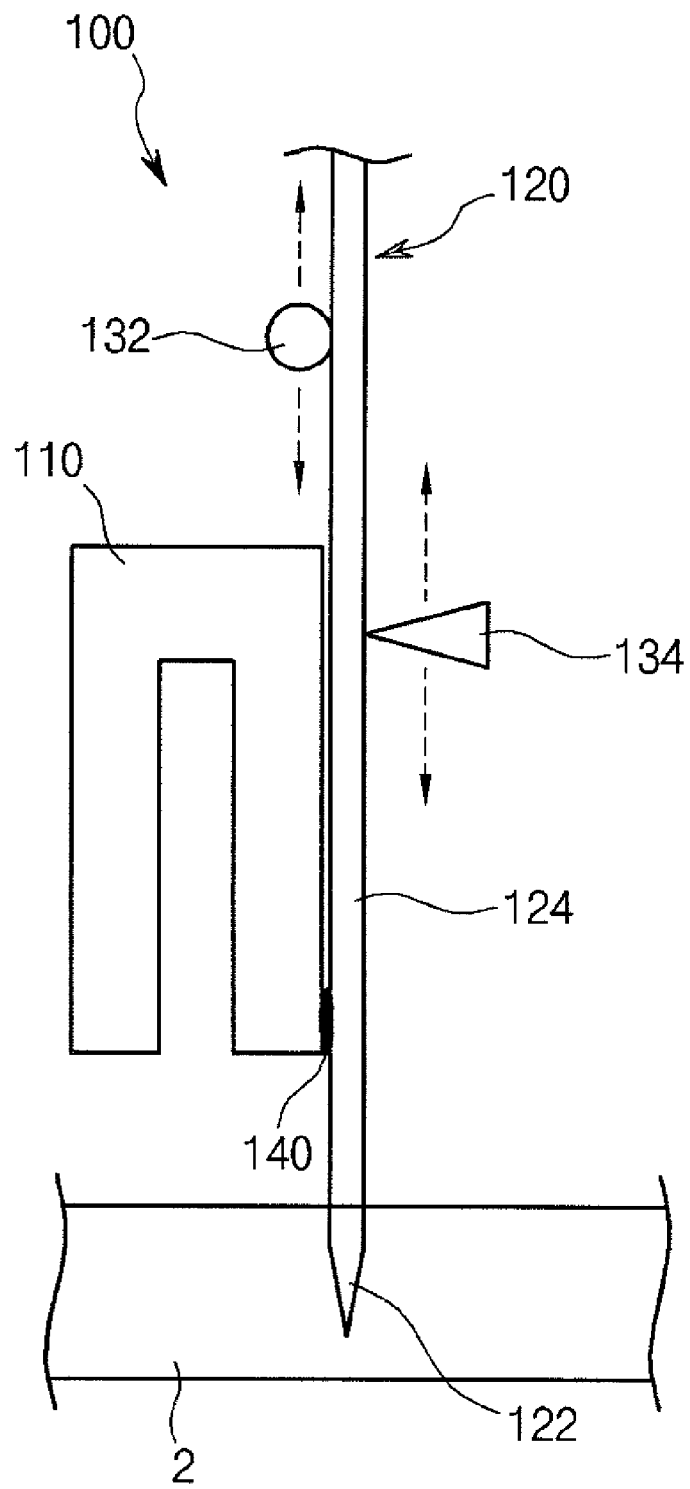
FIGS. 11 and 12 are respectively a front view and a side view illustrating the case that the mechanically-coupled tuning fork-scanning probe vibrating system of FIG. 2 detects a specimen soaked in a liquid medium.
Figure 12:
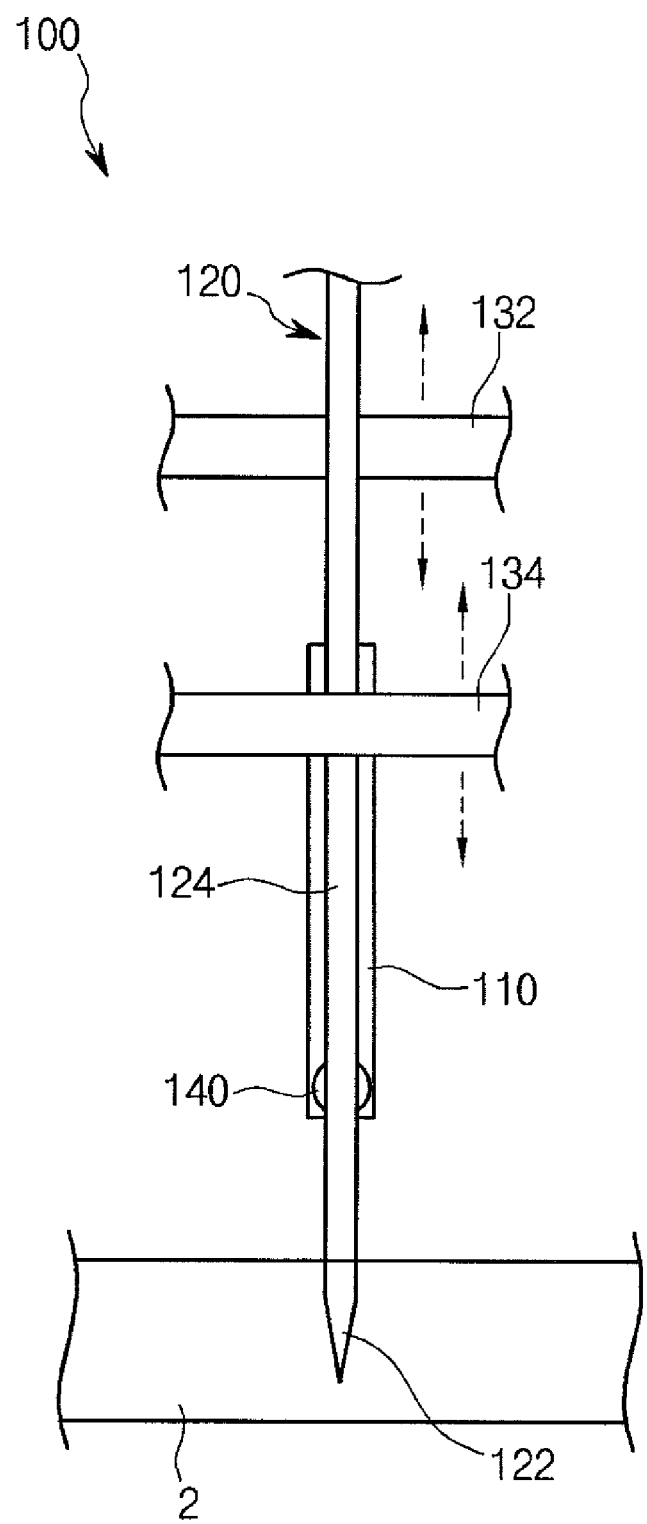

FIGS. 11 and 12 are respectively a front view and a side view illustrating the case that the mechanically-coupled tuning fork-scanning probe vibrating system 100 of FIG. 2 detects a specimen soaked in a liquid medium 2. Referring to FIGS. 11 and 12, in the mechanically-coupled tuning fork-scanning probe vibrating system 100 illustrated in FIG. 2, in order to use a dynamic control method so as to optically detect the specimen soaked in the liquid medium 2, the detection tip 122 of the scanning probe 120 is exposed to an end part of the tuning fork 110 by about 3 mm so that the detection tip 122 can be inserted in the liquid medium 2 and the specimen can be detected. Here, the length of the detection tip 122 can vary according to the thickness (depth) and material property of the liquid medium 2. In this case, as shown in FIG. 10, even when the length of the exposed detection tip 122 of the scanning probe 120 varies, the shape of variation of resonant frequencies of the mechanically-coupled tuning fork-scanning probe vibrating system 100 by using the dynamic control method according to the present invention does not vary. As shown in FIG. 9, even when the detection tip 122 is soaked in the liquid medium 2, the shape of variation of the resonant frequencies of the mechanically-coupled tuning fork-scanning probe vibrating system 100 by using the dynamic control method according to the present invention is the same as in air. The quality factor of the mechanically-coupled tuning fork-scanning probe vibrating system 100 is slightly decreased due to viscosity of the liquid medium 2. However, in the present embodiment, even when the detection tip 122 of the scanning probe 120 is soaked in the liquid medium 2, the mechanically-coupled tuning fork-scanning probe vibrating system 100 has a high quality factor of 2800.

In other words, in the mechanically-coupled tuning fork-scanning probe vibrating system 100 according to the present embodiment, a problem of a conventional scanning probe microscope that, when a scanning probe such as 120 of FIGS. 11 and 12 is soaked in a liquid medium such as 2 of FIGS. 11 and 12, due to high viscosity of a liquid medium such as 2 of FIGS. 11 and 12, the quality factor of a tuning fork such as 110 of FIGS. 11 and 12 is decreased and a specimen soaked in a liquid medium such as 2 of FIGS. 11 and 12 cannot be detected with high resolution has been solved. In the present embodiment, the dynamic vibration control method is used so that, even when the scanning probe 120 is soaked in the liquid medium 2 having high viscosity, the tuning fork 110 has a very high quality factor and the specimen soaked in the liquid medium 2 can be detected with high resolution. In the present structure, the length from the contact point A of the tuning fork 110 and the scanning probe 120 to the detection tip 122 is larger than the case that a specimen in air is detected by about 3 mm so that the scanning probe 120 can be easily inserted in the liquid medium 2.

FIGS. 13A and 13B are graphs showing theoretical calculation of variation of resonant frequencies of the mechanically-coupled tuning fork-scanning probe vibrating system 100 of FIG. 2 by modeling the tuning fork 110 and the scanning probe 120 of the mechanically-coupled tuning fork-scanning probe vibrating system 100 of FIG. 2.

FIG. 13A shows the result of theoretical calculation of variation of resonant frequencies of the mechanically-coupled tuning fork-scanning probe vibrating system 100 of FIG. 2 by modeling a combination body of the tuning fork 110 and the scanning probe 120 in which the dynamic vibration control method is used, wherein the result is obtained by deriving values obtained by theoretically modeling the same conditions as an experimental structure. Referring to FIG. 13A, the horizontal axis represents a distance between a contact point (see A of FIG. 3) of the tuning fork 110 and the scanning probe 120 and the knife-edge balance 134, and the vertical axis represents a resonant frequency of the mechanically-coupled tuning fork-scanning probe vibrating system 100 of FIG. 2, which is determined by positions of the knife-edge balance 134 and the pin-point support 13. The distance between the contact point (see A of FIG. 3) of the tuning fork 110 and the scanning probe 120 and the knife-edge balance 134 is calculated in cases of 11.0 mm, 11.4 mm, 11.8 mm, and 12.2 mm, respectively. A distance between the contact point A of the tuning fork 110 and the scanning probe 120 and a knife edge is calculated from 2.0 mm to 10.2 mm at an interval of 0.2 mm.

FIG. 13B shows the result of theoretical calculation of variation of resonant frequencies of the mechanically-coupled tuning fork-scanning probe vibrating system 100 of FIG. 2 by modeling a combination body of the tuning fork 110 and the scanning probe 120 in which the dynamic vibration control method is used. Referring to FIG. 13B, the horizontal axis represents a distance between a contact point (see A of FIG. 3) of the tuning fork 110 and the scanning probe 120 and the knife-edge balance 134, and the vertical axis represents a resonant frequency of the mechanically-coupled tuning fork-scanning probe vibrating system 100 of FIG. 2, which is determined by positions of the knife-edge balance 134 and the pin-point support 13. The distance between the contact point (see A of FIG. 3) of the tuning fork 110 and the scanning probe 120 and the knife-edge balance 134 is calculated in cases of 12.6 mm, 13.0 mm, 13.4 mm, and 13.8 mm, respectively. A distance between the contact point A of the tuning fork 110 and the scanning probe 120 and a knife edge is calculated from 2.0 mm to 10.2 mm at an interval of 0.2 mm.

Referring to FIGS. 13A and 13B, whether the resonant frequency of the mechanically-coupled tuning fork-scanning probe vibrating system 100 of FIG. 2 that varies according to the position of the knife-edge balance 134 involves a single mode or two modes is determined by the position of the pin-point support 132. Four graphs shown in FIG. 13A represent cases that the distance between the contact point A and the pin-point support 132 is 11.0 mm, 11.4 mm, 11.8 mm, and 12.2 mm, respectively. Four graphs shown in FIG. 13B represent cases that the distance between the contact point A and the pin-point support 132 is 12.6 mm, 13.0 mm, 13.4 mm, and 13.8 mm, respectively. Here, when the distance between the contact point A and the pin-point support 132 is 12.2 mm, 12.6 mm, and 13.0 mm, variation of the resonant frequencies involves two modes. In other words, in the present invention, when variation of the resonant frequencies occurs in a single mode by adjusting the position of the pin-point support 132, the resonant frequency of the mechanically-coupled tuning fork-scanning probe vibrating system 100 of FIG. 2 is closer to the natural frequency of the tuning fork 110. Thus, the quality factor of the mechanically-coupled tuning fork-scanning probe vibrating system 100 of FIG. 2 can be increased. When variation of the resonant frequencies occurs in two modes by adjusting the position of the pin-point support 132, the low quality factor of the mechanically-coupled tuning fork-scanning probe vibrating system 100 of FIG. 2 can be actively controlled. The results show that vibration of the mechanically-coupled tuning fork-scanning probe vibrating system 100 of FIG. 2 can be controlled in various manners by using functions of the pin-point support 132 and the knife-edge balance 134. In FIGS. 13A and 13B, dotted lines marked at a portion of about 32600 Hz represent the natural frequency of the tuning fork 110 of the mechanically-coupled tuning fork-scanning probe vibrating system 100 of FIG. 2. As the resonant frequency of the mechanically-coupled tuning fork-scanning probe vibrating system 100 of FIG. 2 is closer to grey dotted lines, a loss of energy of the tuning fork 110 due to the scanning probe 120 is minimized so that the quality factor of the mechanically-coupled tuning fork-scanning probe vibrating system 100 of FIG. 2 can be increased. Thus, in the present embodiment, after the number of modes of the resonant frequency of the mechanically-coupled tuning fork-scanning probe vibrating system 100 of FIG. 2 is determined by adjusting the position of the pin-point support 132, the resonant frequency and the quality factor of the mechanically-coupled tuning fork-scanning probe vibrating system 100 of FIG. 2 can be accurately controlled by adjusting the position of the knife-edge balance 134 under new boundary conditions.

Figure 14A:
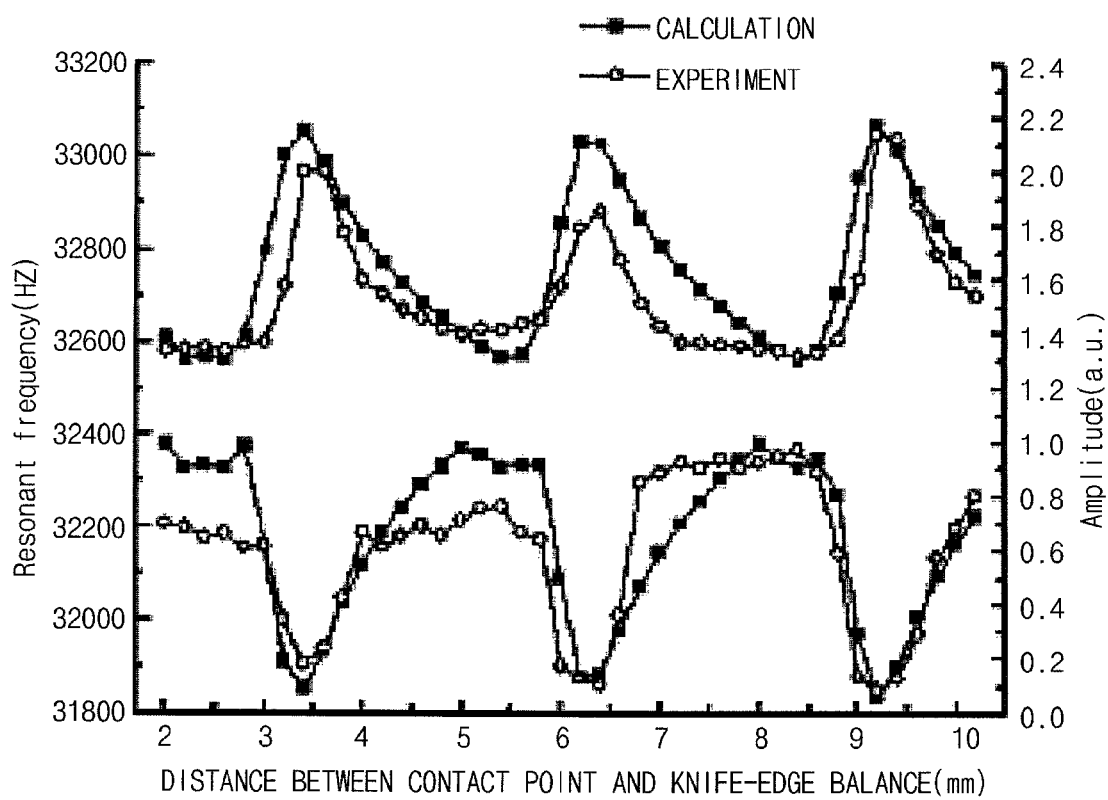
FIGS. 14A and 14B are graphs showing the result of comparing vibration characteristics that are expressed as values are obtained by modeling the tuning fork and the scanning probe of the mechanically-coupled tuning fork-scanning probe vibrating system of FIG. 2 with vibration characteristics that are expressed as values obtained by experiments.
Figure 14B:
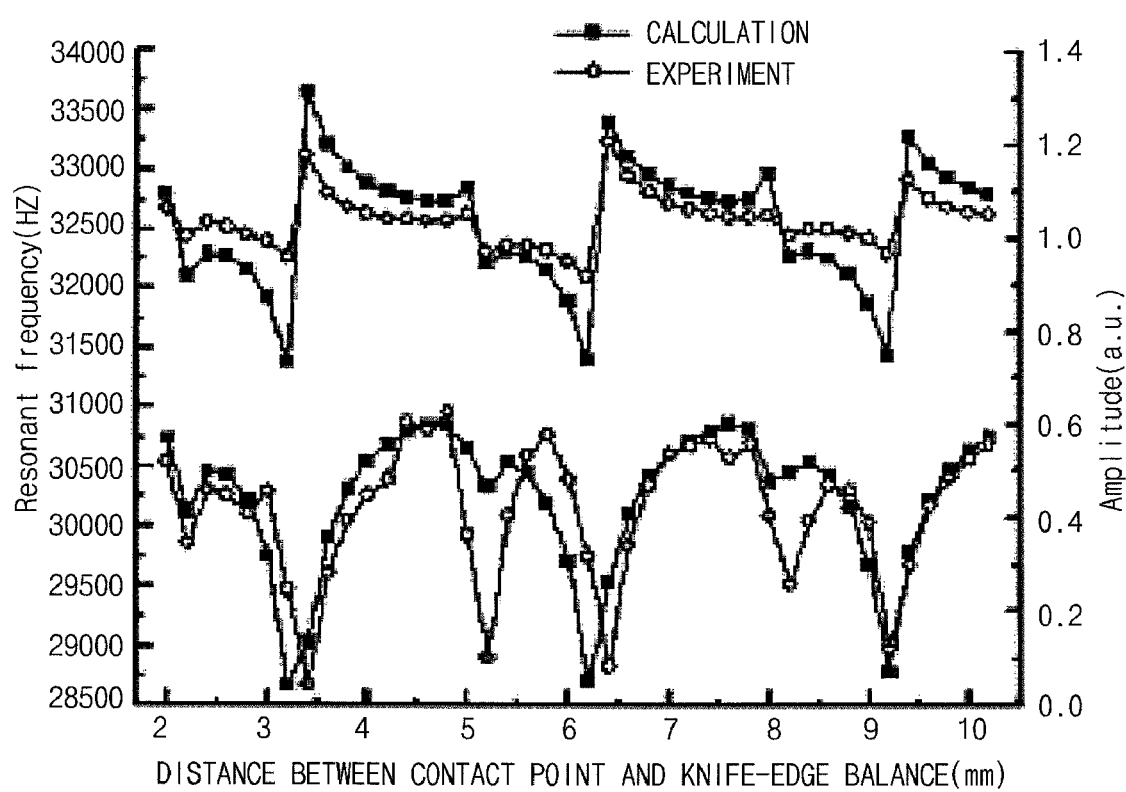

FIGS. 14A and 14B are graphs showing the result of comparing vibration characteristics that are expressed as values obtained by modeling the tuning fork 110 and the scanning probe 120 of the mechanically-coupled tuning fork-scanning probe vibrating system 100 of FIG. 2 with vibration characteristics that are expressed as values obtained by experiments.

FIG. 14A is a graph for comparing experimental vibration characteristics with theoretical vibration characteristics of a combination structure of the tuning fork 110 and the scanning probe 120 in which the pin-point support 132 and the knife-edge balance 134 of the mechanically-coupled tuning fork-scanning probe vibrating system 100 of FIG. 2 are installed, i.e. in the case that the resonant frequency of the mechanically-coupled tuning fork-scanning probe vibrating system 100 of FIG. 2 involves a single mode. The horizontal axis represents a distance between the contact point A and the knife-edge balance 134, and the upper graph shows a resonant frequency, and the lower graph shows amplitude of an output voltage of the tuning fork 110. Black-colored dots in a rectangular shape represent calculation values, and blank dots in a circular shape represent experimental values. The graph of FIG. 14A shows the case that a resonant frequency involves a single mode due to the position of the pin-point support 132.

FIG. 14B is a graph for comparing experimental vibration characteristics with theoretical vibration characteristics of a combination structure of the tuning fork 110 and the scanning probe 120 in which the pin-point support 132 and the knife-edge balance 134 of the mechanically-coupled tuning fork-scanning probe vibrating system 100 of FIG. 2 are installed, i.e. in the case that the resonant frequency of the mechanically-coupled tuning fork-scanning probe vibrating system 100 of FIG. 2 involves a single mode. The horizontal axis represents a distance between the contact point A and the knife-edge balance 134, and the upper graph shows a resonant frequency, and the lower graph shows amplitude of an output voltage of the tuning fork 110. Black-colored dots in a rectangular shape represent calculation values, and blank dots in a circular shape represent experimental values. The graph of FIG. 14B shows the case that a resonant frequency involves two modes due to the position of the pin-point support 132.

FIG. 14B is a graph showing the result of comparing vibration characteristics that are expressed as values obtained by modeling the tuning fork 110 and the scanning probe 120 of the mechanically-coupled tuning fork-scanning probe vibrating system 100 of FIG. 2 in which the dynamic vibration control method is used, with vibration characteristics that are expressed as values obtained by experiments, i.e., in the case that the resonant frequency of the mechanically-coupled tuning fork-scanning probe vibrating system 100 of FIG. 2 involves two modes.

Figure 15A:
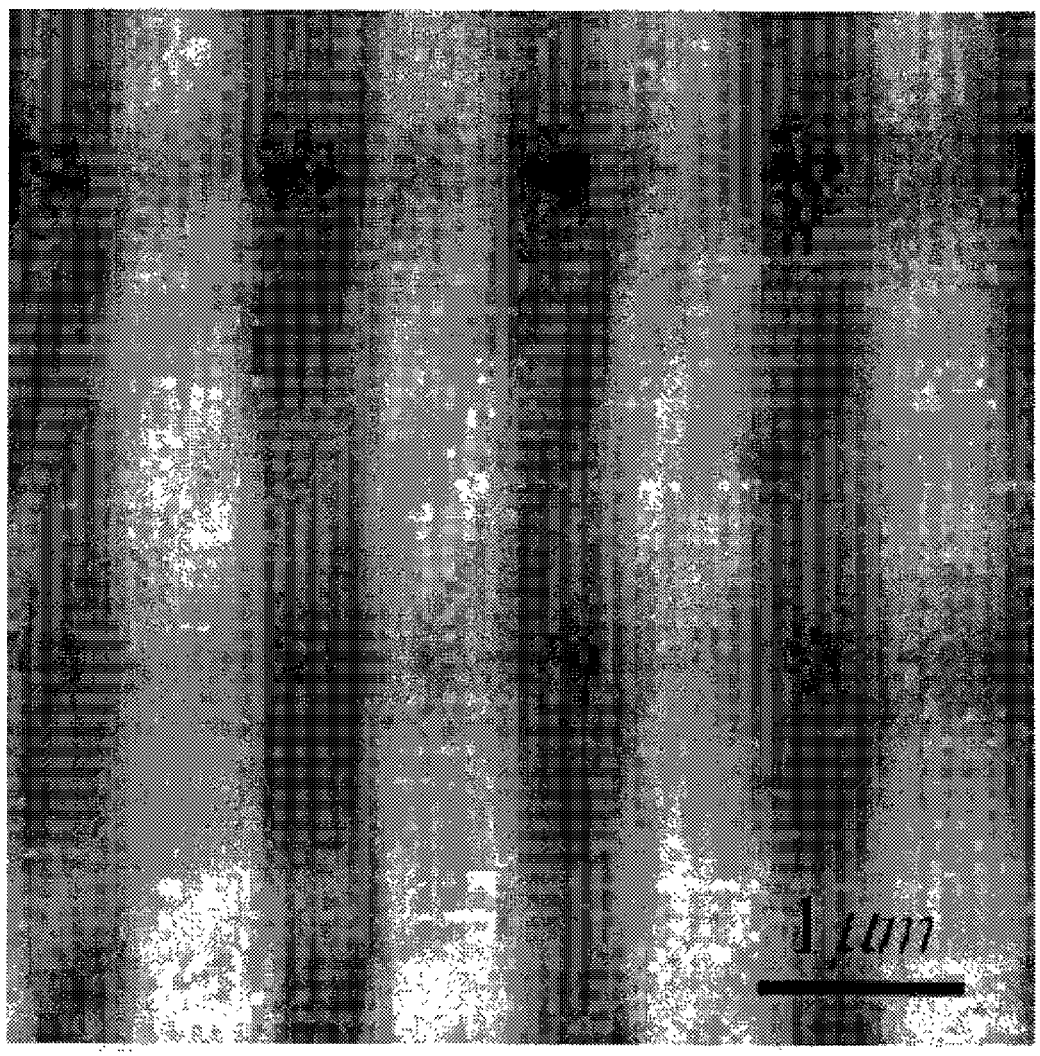
FIGS. 15A and 15B are images of a surface acoustic wave filter, wherein the images are detected by a scanning probe microscope using the mechanically-coupled tuning fork-scanning probe vibrating system of FIG. 2.
Figure 15B:
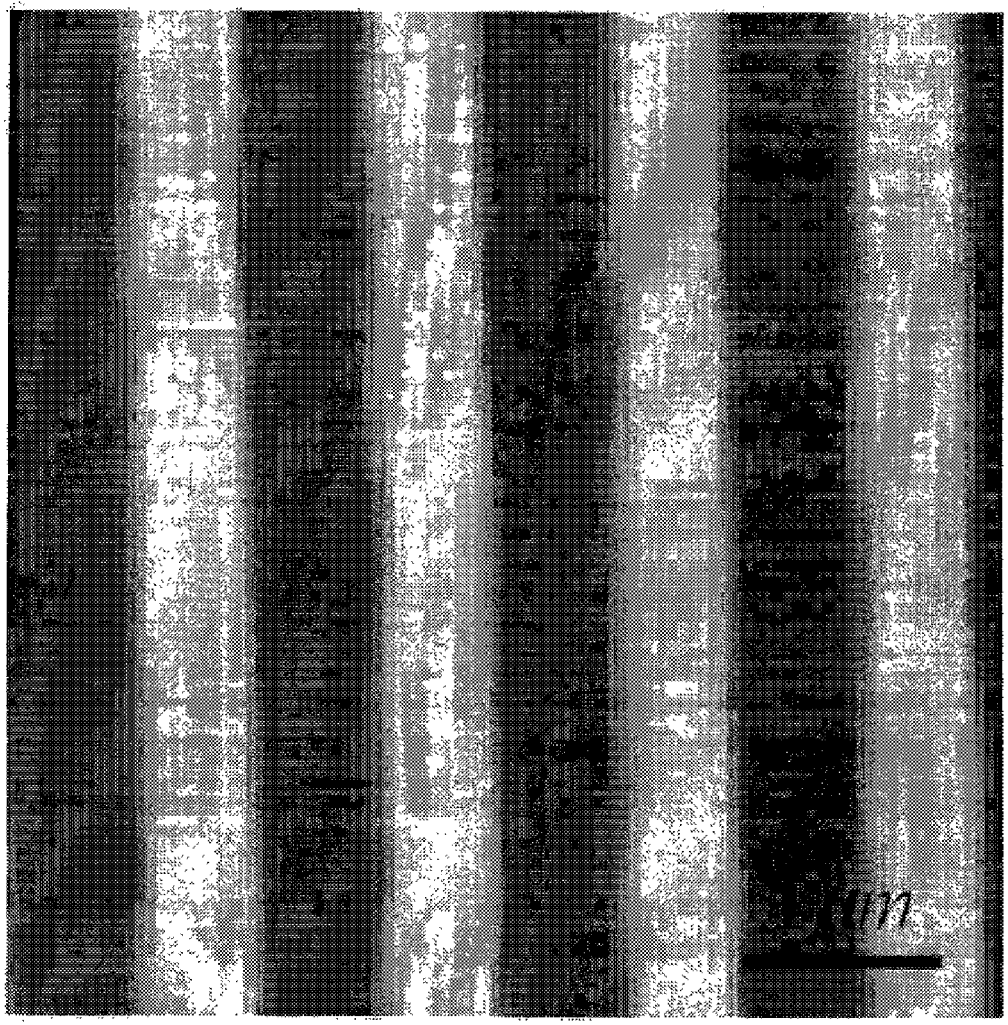

FIGS. 15A and 15B are images of a surface acoustic wave filter, wherein the images are detected by a scanning probe microscope using the mechanically-coupled tuning fork-scanning probe vibrating system 100 of FIG. 2.

FIG. 15A is an image of the shape of the surface of the surface acoustic wave filter having lattice patterns of a 70 nm height, detected by using the combination structure of the tuning fork 110 and the scanning probe 120 in which the pin-point support 132 and the knife-edge balance 134 of the mechanically-coupled tuning fork-scanning probe vibrating system 100 of FIG. 2 are installed, in a scanning probe microscope. A scanning area is 5×5 $\mu m^2$, and the scanning probe microscope is moved in a transverse direction at an interval of 50 nm. In the present embodiment, according to the detection result, a low quality factor of 90 can be actively controlled so that the resolution of the image is not high.

FIG. 15B is an image of the shape of the surface of the surface acoustic wave filter having lattice patterns of a 70 nm height, detected by using the combination structure of the tuning fork 110 and the scanning probe 120 in which the pin-point support 132 and the knife-edge balance 134 of the mechanically-coupled tuning fork-scanning probe vibrating system 100 of FIG. 2 are installed, in a scanning probe microscope. A scanning area is 5×5 $\mu m^2$, and the scanning probe microscope is moved in a transverse direction at an interval of 50 nm. In the present embodiment, according to the detection result, a high quality factor of 5600 can be actively controlled so that the resolution of the image is high.

Figure 16A:
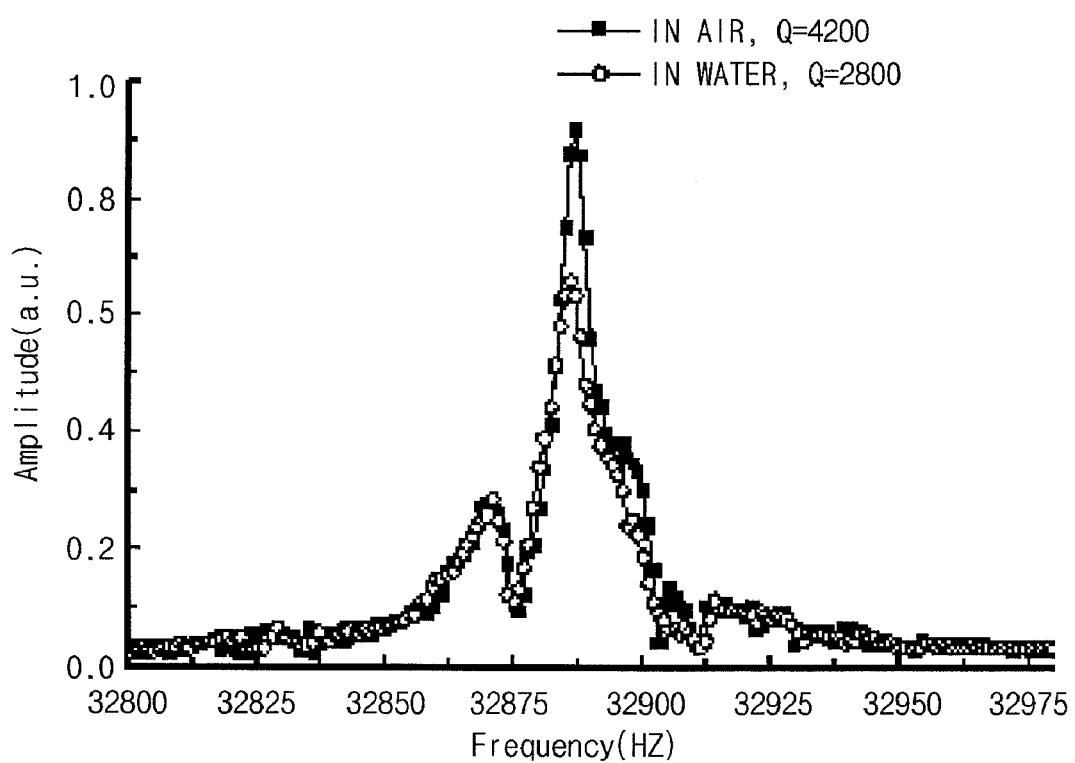
FIGS. 16A and 16B are graphs showing frequency response curves and vibration characteristics both in cases that the scanning probe is exposed to air and is soaked in the liquid medium of the mechanically-coupled tuning fork-scanning probe vibrating system of FIG. 2.
Figure 16B:
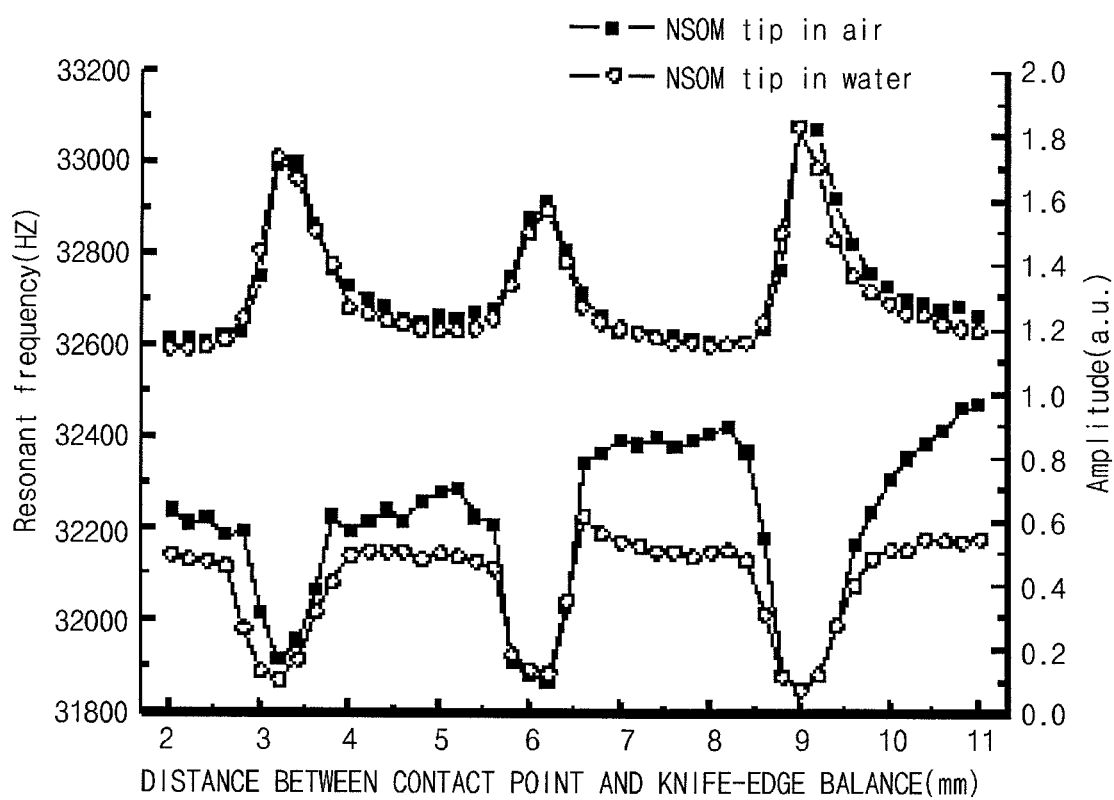

FIGS. 16A and 16B are graphs showing frequency response curves and vibration characteristics both in cases that the scanning probe 120 is exposed to air and is soaked in the liquid medium 2 of the mechanically-coupled tuning fork-scanning probe vibrating system 100 of FIG. 2.

FIG. 16A is a graph showing frequency response curves in which amplitude of an output voltage of the tuning fork 110 is detected by making amplitude of a voltage applied to the tuning fork 110 constant and by varying a frequency of the mechanically-coupled tuning fork-scanning probe vibrating system 100 of FIG. 2, both in cases that the scanning probe 120 is exposed to air and is soaked in the liquid medium 2 of the mechanically-coupled tuning fork-scanning probe vibrating system 100 of FIG. 2 by using the dynamic vibration control method illustrated in FIG. 3. Here, the quality factor of the mechanically-coupled tuning fork-scanning probe vibrating system 100 of FIG. 2 is defined by dividing the resonant frequency of the mechanically-coupled tuning fork-scanning probe vibrating system 100 of FIG. 2 by a half width of the frequency response curve. When the scanning probe 120 is in air, the quality factor is 4200, and when the scanning probe 120 is soaked in the liquid medium 2, the quality factor is 2800.

FIG. 16B is a graph showing the result of comparing experimental vibration characteristic values of the combination structure of the tuning fork 110 and the scanning probe 120 in which the pin-point support 132 and the knife-edge balance 134 are installed, both in cases that the scanning probe 120 is exposed to air, as shown in FIG. 3, and is soaked in the liquid medium 2 of the mechanically-coupled tuning fork-scanning probe vibrating system 100 of FIG. 2, as shown in FIG. 11. The horizontal axis represents a distance between the contact point A and the knife-edge balance 134, and the upper graph shows a resonant frequency, and the lower graph shows amplitude of an output voltage of the tuning fork 110. Black-colored dots in a rectangular shape represent values that are obtained when the scanning probe 120 is in air, and blank dots in a circular shape represent values that are obtained when the scanning probe 120 is soaked in the liquid medium 2. When the scanning probe 120 is soaked in the liquid medium 2, the resonant frequency of the mechanically-coupled tuning fork-scanning probe vibrating system 100 of FIG. 2 is maintained at almost the same level, and the output voltage of the tuning fork 110 is decreased.

Figure 17:
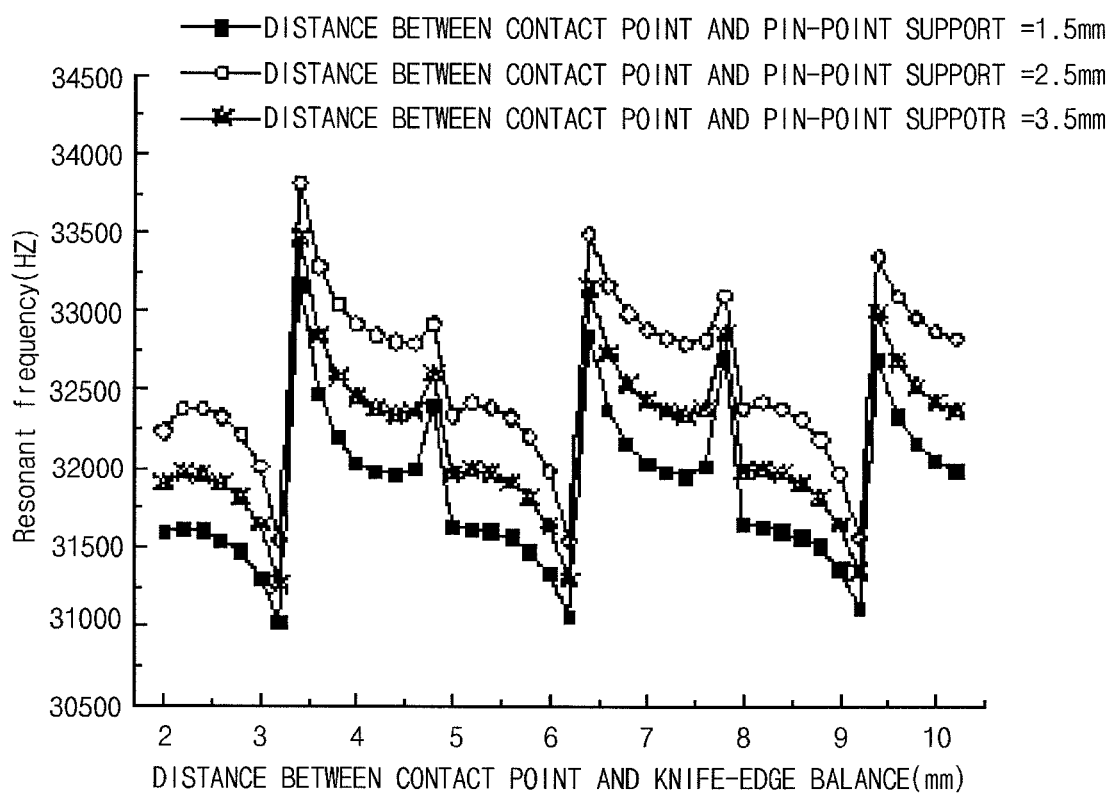
FIG. 17 is a graph showing vibration characteristics with respect to variation of distances between the contact point of the tuning fork and the scanning probe and an end of the scanning probe of the mechanically-coupled tuning fork-scanning probe vibrating system of FIG. 2.

FIG. 17 is a graph showing vibration characteristics with respect to variation of distances between the contact point A of the tuning fork 110 and the scanning probe 120 and an end of the scanning probe 120 of the mechanically-coupled tuning fork-scanning probe vibrating system 100 of FIG. 2. In theoretical modeling of the structure of the mechanically-coupled tuning fork-scanning probe vibrating system 100 of FIG. 2, the resonant frequency of the mechanically-coupled tuning fork-scanning probe vibrating system 100 of FIG. 2 is calculated by making a distance between the contact point A of the tuning fork 110 and the scanning probe 120 and the pin-point support 132 constant and by varying the length from the contact point A to the knife-edge balance 134 from 2 mm to 10.2 mm. Three graphs shown in FIG. 17 show cases that the distance from the contact point A to the detection tip 122 is 1.5 mm, 2.5 mm, and 3.5 mm, respectively.

Referring to FIG. 17, even when the length from the contact point A to the detection tip 122 varies, the shape of variation of the resonant frequencies is maintained. Thus, the vibration characteristics of the mechanically-coupled tuning fork-scanning probe vibrating system 100 of FIG. 2 are greatly affected by a portion in which the pin-point support 132 and the knife-edge balance 134 are installed, i.e., a portion that is opposite to the detection tip 122 based on the contact point A. This means that the quality factor of the mechanically-coupled tuning fork-scanning probe vibrating system 100 of FIG. 2 can be actively controlled by the knife-edge balance 134 and the pin-point support 132.

Figure 18A:
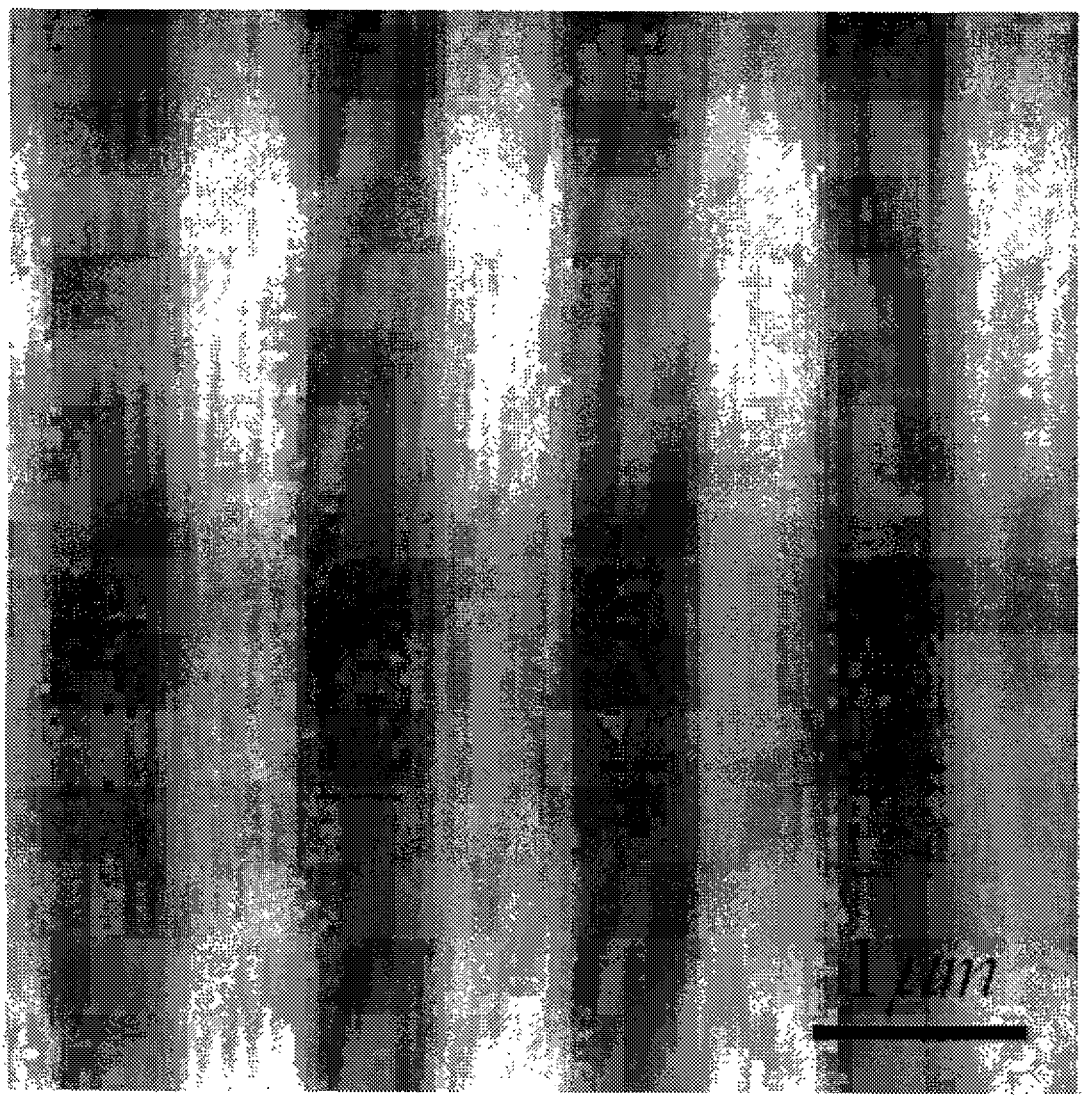
FIGS. 18A and 18B are an image of a surface acoustic wave filter in air and an image of the surface acoustic wave filter in a liquid medium, respectively, taken by a scanning probe microscope using the mechanically-coupled tuning fork-scanning probe vibrating system of FIG. 2.
Figure 18B:
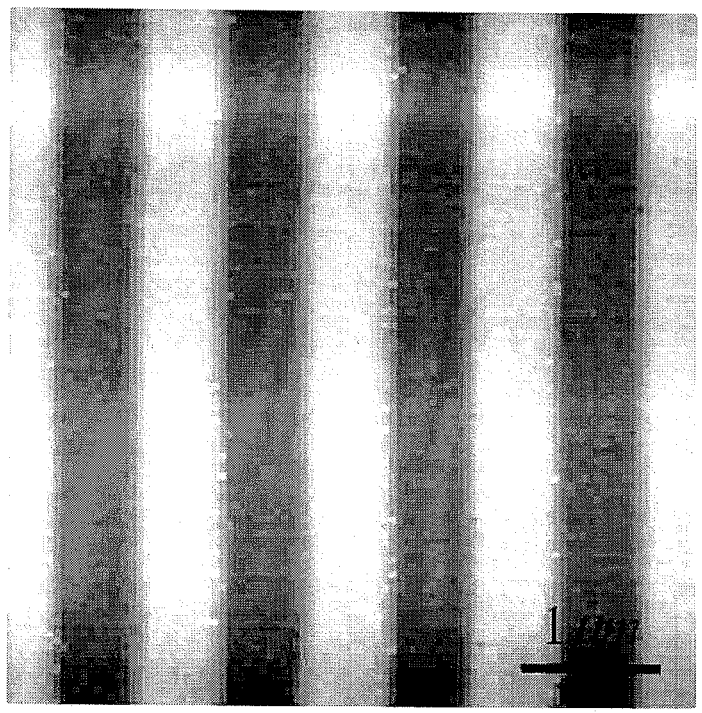
Figure 19:
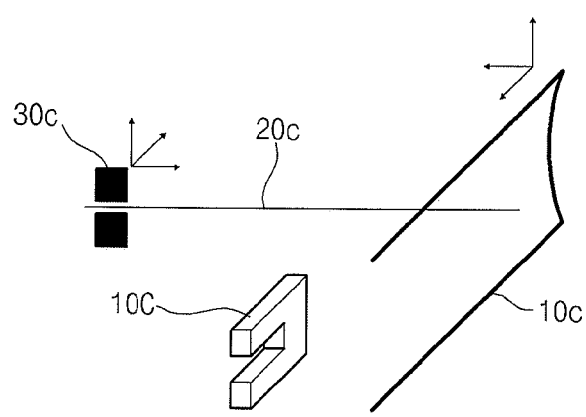
FIGS. 19 and 20 illustrate a mechanically-coupled tuning fork-scanning probe vibrating system according to comparative examples.
Figure 20:
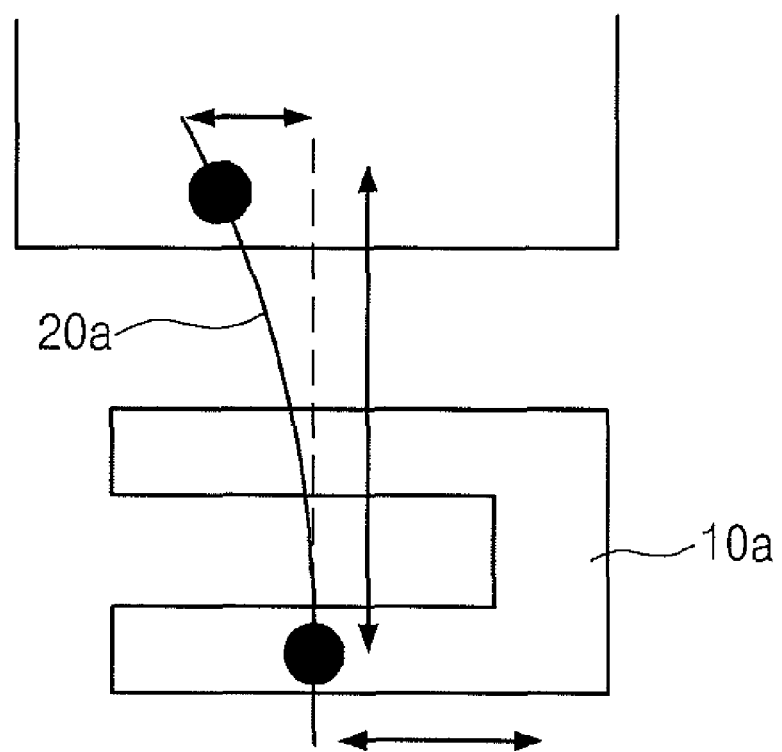

FIGS. 18A and 18B are an image of a surface acoustic wave filter in air and an image of the surface acoustic wave filter in a liquid medium, respectively, taken by a scanning probe microscope using the mechanically-coupled tuning fork-scanning probe vibrating system 100 of FIG. 2.

FIG. 18A is an image of the shape of the surface of the surface acoustic wave filter having lattice patterns of a 70 nm height in air, detected by using the combination structure of the tuning fork 110 and the scanning probe 120 in which the pin-point support 132 and the knife-edge balance 134 of the mechanically-coupled tuning fork-scanning probe vibrating system 100 of FIG. 2 are installed, in the scanning probe microscope. A scanning area is 5×5 $\mu m^2$, and the scanning probe microscope is moved in a transverse direction at an interval of 50 nm. FIG. 18B is an image of the shape of the surface of the surface acoustic wave filter having lattice patterns of a 70 nm height in the liquid medium, detected by soaking the scanning probe 120 in a liquid medium such as 2 of FIG. 11 and by using the combination structure of the tuning fork 110 and the scanning probe 120 in a scanning probe microscope. A scanning area is 5×5 $\mu m^2$, and the scanning probe microscope is moved in a transverse direction at an interval of 50 nm.

When comparing FIGS. 18A and 18B, the image shown in FIG. 18B is detected with the same resolution as resolution used when taking the image shown in FIG. 18A. Thus, the mechanically-coupled tuning fork-scanning probe vibrating system 100 of FIG. 2 is appropriate for detecting a specimen soaked in the liquid medium 2 with high resolution.

Accordingly, in the embodiments of the present invention, a contact member contacts the surface of a scanning probe, and the position of the contact member varies in the lengthwise direction of the scanning probe according to the purpose so that the quality factor of a mechanically-coupled tuning fork-scanning probe vibrating system can be actively controlled. Furthermore, the position of a tuning fork varies according to the natural frequency of the tuning fork so that the quality factor of the mechanically-coupled tuning fork-scanning probe vibrating system can be increased. Thus, a general solid specimen in air and a specimen soaked in a liquid medium such as 2 of FIGS. 11 and 12 having high viscosity can be detected with high resolution.

As described above, in the mechanically-coupled tuning fork-scanning probe vibrating system according to the present invention, the following effects can be obtained.

First, the quality factor of the mechanically-coupled tuning fork-scanning probe vibrating system can be controlled not to be decreased as compared to the natural quality factor of the tuning fork, and the mechanically-coupled tuning fork-scanning probe vibrating system has a very high quality factor as compared to a conventional mechanically-coupled tuning fork-scanning probe vibrating system so that a very small shear force between a detection tip of a scanning probe and the surface of a specimen can be sensitively detected and the specimen can be detected with high resolution.

Second, a soft specimen such as a biological specimen can be accurately detected, and the accurate shape of cell, bacterium or virus to be investigated in the field of life sciences can be detected, and optical characteristics of the soft specimen can be analyzed.

Third, in a dynamic vibration control method using a pin-point support and a knife-edge balance, the quality factor of the mechanically-coupled tuning fork-scanning probe vibrating system can be actively and accurately controlled regardless of the ambient environment of the specimen. Thus, the range of controlling the quality factor is very wide so that a better performance than in quality factor control using a conventional circuitry method can be provided.

Fourth, the quality factor of the mechanically-coupled tuning fork-scanning probe vibrating system can be actively controlled so that a detection time can be actively adjusted, and a method that is appropriate for the situation of the specimen and the purpose of detection can be selected so that the use range of the mechanically-coupled tuning fork-scanning probe vibrating system can be enlarged.

Fifth, both a specimen in air and a specimen soaked in a liquid medium can be detected with high resolution so that the mechanically-coupled tuning fork-scanning probe vibrating system can be widely used in various fields such as research of medicine and biology.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A mechanically-coupled tuning fork-scanning probe vibrating system, the system comprising:
   a tuning fork capable of vibrating upon application of an AC voltage thereto;
   a scanning probe attached to a side of the tuning fork and capable of vibrating in response to vibrations of the tuning fork; and
   a contact member contacting at least one side surface of the scanning probe and adjusting a position of a contact point at which the contact member contacts with the scanning probe, to vary a natural frequency of vibration of the mechanically combined tuning fork and scanning probe,
   wherein the contact member comprises:
   a pin-point support contacting at a first side surface of the scanning probe and movable along a lengthwise direction of the scanning probe; and
   a knife-edge balance contacting at a second side surface of the scanning probe opposite to first side surface, and movable along the lengthwise direction of the scanning probe between a point where the scanning probe is attached to the tuning fork, and a point where the pin-point support contacts the first side surface of the scanning probe.

2. The system of claim 1, wherein the scanning probe and the tuning fork are attached to each other so that a lengthwise direction of the tuning fork and the lengthwise direction of the scanning probe are parallel to each other.

3. The system of claim 1, wherein the scanning probe and the tuning fork are attached to each other so that a lengthwise direction of the tuning fork and the lengthwise direction of the scanning probe are perpendicular to each other.

4. The system of claim 1, wherein the scanning probe is inserted into a viscous medium so as to detect optical characteristics of a specimen soaked in the viscous medium.

5. The system of claim 1, wherein the tuning fork comprises a detection circuit installed therein capable of detecting amplitude and phase of the tuning fork, the tuning fork is formed of $SiO_2$, and wherein the scanning probe has a beam shape and is formed of glass.

6. The system of claim 1, wherein the tuning fork comprises a detection circuit installed therein capable of detecting amplitude and phase of the tuning fork, the tuning fork is formed of $SiO_2$, and wherein the scanning probe has a beam shape and is formed of optical fiber.

* * * * *